(12) United States Patent
Gao et al.

(10) Patent No.: US 11,988,154 B2
(45) Date of Patent: May 21, 2024

(54) DIRECT DRIVE ELECTRICALLY-GEARED TURBOFAN

(71) Applicant: THE BOEING COMPANY, Chicago, IL (US)

(72) Inventors: Lijun Gao, Renton, WA (US); Shengyi Liu, Sammamish, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/535,325

(22) Filed: Nov. 24, 2021

(65) Prior Publication Data

US 2022/0243664 A1 Aug. 4, 2022

Related U.S. Application Data

(60) Provisional application No. 63/124,020, filed on Dec. 10, 2020.

(51) Int. Cl.
*F02C 9/00* (2006.01)
*F02C 7/36* (2006.01)

(52) U.S. Cl.
CPC ............... *F02C 9/00* (2013.01); *F02C 7/36* (2013.01); *F05D 2220/36* (2013.01);
(Continued)

(58) Field of Classification Search
CPC .. H02K 49/102; H02K 49/104; H02K 7/1823; F02C 7/36; F02C 3/113;
(Continued)

(56) References Cited

U.S. PATENT DOCUMENTS 6,949,854 B1 * 9/2005 Schlicht ............... H02K 49/102
310/83
9,130,494 B2 9/2015 Benson et al.
(Continued)

FOREIGN PATENT DOCUMENTS

EP 1931018 A2 6/2008
EP 2613033 A2 7/2013

OTHER PUBLICATIONS

M. H. Nagrial, J. Rizk and A. Hellany, "Design and Development of Magnetic Torque Couplers and Magnetic Gears," 2007 International Conference on Electrical Engineering, 2007, pp. 1-5, doi: 10.1109/ICEE.2007.4287283. (Year: 2007).*
(Continued)

*Primary Examiner* — David P. Olynick
(74) *Attorney, Agent, or Firm* — Patterson + Sheridan, LLP

(57) ABSTRACT

A direct drive electrically-geared turbofan is provided via a first magnetic gearbox assembly connected to a fan of a turbofan engine; a second magnetic gearbox assembly connected to a spool shaft of the turbofan engine; and a speed controller configured to adjust a rotational speed of the fan based on a rotational speed of the spool shaft by selectively coupling and decoupling the first magnetic gearbox assembly with the second magnetic gearbox assembly. In various aspects, the first or second magnetic gearbox assembly includes a permanent magnet array, while a different one of the first or second magnetic gearbox assemblies includes a rotor winding separated from the permanent magnet array by an air gap; and the speed controller is configured to selectively couple and decouple the first and second magnetic gearbox assemblies with each other via controlling a switch in a winding circuit with the rotor winding.

13 Claims, 15 Drawing Sheets

(52) U.S. Cl.
CPC ............... *F05D 2260/4031* (2013.01); *F05D 2260/404* (2013.01); *F05D 2270/02* (2013.01); *F05D 2270/304* (2013.01)

(58) Field of Classification Search
CPC .. F02C 9/00; F05D 2220/36; F05D 2220/768; F05D 2260/404; F05D 2260/4031; F05D 2270/03; F05D 2270/304
See application file for complete search history.

(56) References Cited

U.S. PATENT DOCUMENTS

| | | | |
|---|---|---|---|
| 9,136,782 | B2 | 9/2015 | Benson et al. |
| 9,588,535 | B2 | 3/2017 | Solodovnik et al. |
| 10,547,269 | B2 | 1/2020 | Gao et al. |
| 10,622,931 | B1 | 4/2020 | Gao et al. |
| 2008/0136189 | A1* | 6/2008 | Qu ..................... H02K 49/02 310/68 B |
| 2009/0272121 | A1* | 11/2009 | Youssef ................. F02C 3/113 60/39.25 |
| 2015/0115108 | A1 | 4/2015 | Benson et al. |
| 2016/0258356 | A1* | 9/2016 | Lerg ..................... H02K 16/04 |
| 2020/0309027 | A1 | 10/2020 | Rytkonen |
| 2021/0324804 | A1 | 10/2021 | Liu |

OTHER PUBLICATIONS

"Motor Control using PWM and PID," Stratify Labs, Oct. 15, 2013, https://blog.stratifylabs.dev/device/2013-10-15-Motor-Control-using-PWM-and-PID/, (Year: 2013).*

Andreas Linke-Diesinger, "Systems of Commerical Turbofan Engines," @ 2008 Springer-Verlag Berlin Heidelberg. (Year: 2008).*

"Geared Turbofan." Wikipedia, Wikimedia Foundation, May 13, 2020, https://en.wikipedia.org/w/index.php?title=Geared_turbofanoldid=956484505.

Hurst.org, "Chapter 6: Electronics and Chapter 19: Power Plant," Airbus Technical Notes, pp. 1-2, 16-18 and 44-49, downloaded Sep. 1, 2020.

European Patent Office, Extended European Search Report for Application 21213429.0-1004 dated Apr. 19, 2022.

* cited by examiner

DIRECT DRIVE ELECTRICALLY-GEARED TURBOFAN

CROSS-REFERENCES TO RELATED APPLICATIONS

The present disclosure claims priority to U.S. Provisional Patent Application Ser. No. 63/124,020 filed Dec. 10, 2020, entitled "DIRECT DRIVE ELECTRICALLY-GEARED TURBOFAN", which is incorporated herein by reference in its entirety.

FIELD

Aspects of the present disclosure generally relate to turbofan engines. More particularly, the present disclosure relates to turbofan engines configured to convert the mechanical rotational energy from the turbine-driven spool shafts into mechanical rotational energy in the fan via electromagnet forces.

BACKGROUND

In a turbofan engine, high pressure exhaust from burning fuel in a combustion chamber rotates various turbines. These turbines, when rotated, in turn impart rotation on spool shafts. The spool shafts, in turn, are connected to various compressors that feed air into the combustion chamber and to a fan that propels air through a bypass chamber around the turbine. The air propelled by the fan provides a portion (often a significant portion in "high-bypass" turbofan engines) of the motive force for the turbofan engine.

During operation of a conventional turbofan engine, a mechanical gearing arrangement (e.g., planetary gears) allows the fan to rotate at a different rotational speed than the spool shaft that provides rotational forces to the fan. The mechanical gearing arrangements are often heavy and bulky, and are prone to mechanical stresses (e.g., wear, material fatigue, lubricant leaks, etc.), which requires frequent inspection and maintenance to keep in working order. Additionally, the mechanical gearing arrangements, due to physical contact between parts, can cause noise and vibration in the turbofan engine in addition to the mechanical stresses between the components of the mechanical gearing arrangement itself.

SUMMARY

The present disclosure provides a system in one aspect, the system including: a first magnetic gearbox assembly connected to a fan of a turbofan engine; a second magnetic gearbox assembly connected to a spool shaft of the turbofan engine; and a speed controller configured to adjust a rotational speed of the fan based on a rotational speed of the spool shaft by selectively coupling and decoupling the first magnetic gearbox assembly with the second magnetic gearbox assembly.

In one aspect, in combination with any example system above or below, the first magnetic gearbox assembly includes a permanent magnet array; the second magnetic gearbox assembly includes a rotor winding separated from the permanent magnet array by an air gap; and the speed controller is configured to selectively couple and decouple the first magnetic gearbox assembly with the second magnetic gearbox assembly via opening and closing a switch in a winding circuit with the rotor winding.

In one aspect, in combination with any example system above or below, the second magnetic gearbox assembly includes a permanent magnet array; the first magnetic gearbox assembly includes a rotor winding separated from the permanent magnet array by an air gap; and the speed controller selectively is configured to couple and decouple the first magnetic gearbox assembly with the second magnetic gearbox assembly via opening and closing a switch in a winding circuit with the rotor winding.

In one aspect, in combination with any example system above or below, the first magnetic gearbox assembly is positioned coaxially within a cavity defined by the second magnetic gearbox assembly.

In one aspect, in combination with any example system above or below, the second magnetic gearbox assembly is positioned coaxially within a cavity defined by the first magnetic gearbox assembly.

In one aspect, in combination with any example system above or below, the first magnetic gearbox assembly and the second magnetic gearbox assembly are electromagnetically linked via a coaxial magnetic field.

In one aspect, in combination with any example system above or below, the speed controller is configured to decouple the first magnetic gearbox assembly from the second magnetic gearbox assembly by at least opening a switch via a switch driver powered by a current generated by the first magnetic gearbox assembly rotating relative to the second magnetic gearbox assembly.

In one aspect, in combination with any example system above or below, the speed controller is configured to adjust the rotational speed of the fan based on a difference between a reference speed for the fan and a measured speed of the fan.

In one aspect, in combination with any example system above or below, the speed controller further comprises a speed sensor, the speed sensor including at least one of: a Hall-effect sensor; an inductive sensor; or an opto-isolator sensor.

In one aspect, in combination with any example system above or below, the system further includes an engine thrust controller configured to transmit the reference speed to the speed controller via contactless communication.

The present disclosure provides a turbofan engine in one aspect, the turbofan engine including: a fan; a turbine enclosure, comprising: an air intake at an upstream end; a compression section downstream of the air intake; a combustion section downstream of the compression section; a turbine section downstream of the combustion section; and an exhaust at a downstream end; a first spool shaft coupled with a first compressor of the compression section and with a first turbine of the turbine section; an electrical gearbox located upstream of the turbine enclosure, the electrical gearbox including a first magnetic gearbox assembly connected to the fan and a second magnetic gearbox assembly connected to the first spool shaft, wherein the electrical gearbox is configured to transfer rotational energy over an air gap between the first magnetic gearbox assembly and the second magnetic gearbox assembly to the fan rotating at a first rotational speed from the first spool shaft rotating at a second rotational speed; and a speed controller coupled to the electrical gearbox and configured to selectively couple and decouple the first magnetic gearbox assembly with the second magnetic gearbox assembly over the air gap to adjust the first rotational speed to a variable fan reference speed while maintaining the second rotational speed at a constant rate.

In one aspect, in combination with any example turbofan engine above or below, the first magnetic gearbox assembly includes a permanent magnet array and the second magnetic gearbox assembly includes a winding circuit defining a rotor winding; and the speed controller is configured to reduce a duty cycle of a switch in the winding circuit to reduce the first rotational speed relative to the second rotational speed.

In one aspect, in combination with any example turbofan engine above or below, the first magnetic gearbox assembly includes a winding circuit defining a rotor winding and the second magnetic gearbox assembly includes a permanent magnet array; and the speed controller is configured to reduces a duty cycle of a switch in the winding circuit to reduce the first rotational speed relative to the second rotational speed.

In one aspect, in combination with any example turbofan engine above or below, the air gap is one of: coaxial to the first spool shaft defined by disposing the second magnetic gearbox assembly in a first cavity defined by the first magnetic gearbox assembly; coaxial to the first spool shaft defined by the first magnetic gearbox assembly in a second cavity defined by the second magnetic gearbox assembly; and perpendicular to an axis of rotation for the first spool shaft defined by disposing the first magnetic gearbox assembly parallel to the second magnetic gearbox assembly.

The present disclosure provides a method in one aspect, the method including: rotating a spool shaft in a turbofan engine at a first rotational speed; transferring rotational energy from the spool shaft to a fan in the turbofan engine via an electrical gearbox; adjusting a portion of the rotational energy transferred to the fan based on a duty cycle of a switch in a winding circuit in the electrical gearbox; and rotating the fan at a second rotational speed based on the duty cycle.

In one aspect, in combination with any example method above or below, the electrical gearbox includes: a first magnetic gearbox assembly including the winding circuit and the switch, wherein the first magnetic gearbox assembly is coupled to the spool shaft; and a second magnetic gearbox assembly including a permanent magnet array,
wherein the second magnetic gearbox assembly is coupled to the fan and separated from the first magnetic gearbox assembly via an air gap.

In one aspect, in combination with any example method above or below, the electrical gearbox includes: a first magnetic gearbox assembly including the winding circuit and the switch, wherein the first magnetic gearbox assembly is coupled to the fan; and a second magnetic gearbox assembly including a permanent magnet array, wherein the second magnetic gearbox assembly is coupled to the spool shaft and separated from the first magnetic gearbox assembly via an air gap.

In one aspect, in combination with any example method above or below, the method further includes: measuring the second rotational speed; and in response to the second rotational speed not matching within a threshold of a reference speed for the fan, adjusting the duty cycle of the switch while continuing to rotate the spool shaft at the first rotational speed.

The present disclosure provides a method in one aspect, the method including: affixing a first magnetic gearbox assembly, including a first one of a winding circuit defining a rotor winding with a selectively configurable switch and a permanent magnet array, to a first spool shaft of a turbofan engine; affixing a second magnetic gearbox assembly, including a second one of the winding circuit and the permanent magnet array, different from the first one, to a fan of the turbofan engine, wherein the first magnetic gearbox assembly and the second magnetic gearbox assembly define an air gap there between; affixing a speed sensor 520 in the turbofan engine to monitor a rotational speed of the fan; and coupling a speed controller to the speed sensor and to the winding circuit, wherein the speed controller is configured to adjust a duty cycle of the selectively configurable switch based on a difference between the rotational speed of the fan and a reference speed for the fan.

In one aspect, in combination with any example method above or below, affixing the first magnetic gearbox assembly and affixing the second magnetic gearbox assembly defines the air gap by one of: disposing the first magnetic gearbox assembly in a first cavity defined by the second magnetic gearbox assembly, wherein the air gap is coaxial to the first spool shaft; disposing the second magnetic gearbox assembly in a second cavity defined by the first magnetic gearbox assembly, wherein the air gap is coaxial to the first spool shaft; and disposing the first magnetic gearbox assembly parallel to the second magnetic gearbox assembly, wherein the air gap is perpendicular to an axis of rotation for the first spool shaft.

The present disclosure provides a processing system in one aspect, the processing system including: a memory comprising computer-executable instructions; and a processor configured to execute the computer-executable instructions and cause the processing system to perform any of the methods above.

The present disclosure provides a non-transitory computer-readable medium in one aspect, the non-transitory computer-readable medium comprising computer-executable instructions that, when executed by a processor of a processing system, cause the processing system to perform any of the methods above.

The present disclosure provides a computer program product in one aspect, the computer program product being embodied on a computer readable storage medium comprising code for performing any of the methods above.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides for controllable electrically geared turbofan engines, which substitute the mechanical gearing arrangement between the spool shafts and the fans for electromagnetic couplings. An electromagnetic coupling allows for the transfer of rotational energy/torque without physical contact between the gear components, which can reduce the weight and size of turbofan engine assemblies as well as reduce the maintenance needs of the gearing arrangement compared to mechanical gearing arrangements.

A speed controller is provided that adjusts an effective "gear ratio" between the spool shaft and the fan, which enables more continuous control of the rotation speed (e.g., revolutions per minute (RPM)) of the fan. Stated differently, the rotational speed of the fan can be controlled independently of the rotational speed of the spool shaft so that the fan may be driven at a variable rate while driving the spool shaft at a relatively more constant rate that is optimized for various performance characteristics of the turbofan engine. Beneficially, the electromagnetic gearbox and speed controller of the present disclosure can provide greater fuel efficiency over a wider range of the thrust and speed of the turbofan engine than is provided by conventional statically-geared turbofan engines.

Although the examples provided in the present disclosure primarily illustrate a turbofan of an aircraft, the electrical gearing arrangements described in the present disclosure may be used in conjunction with turbofan engines in various other vehicles.

Figure 1A:
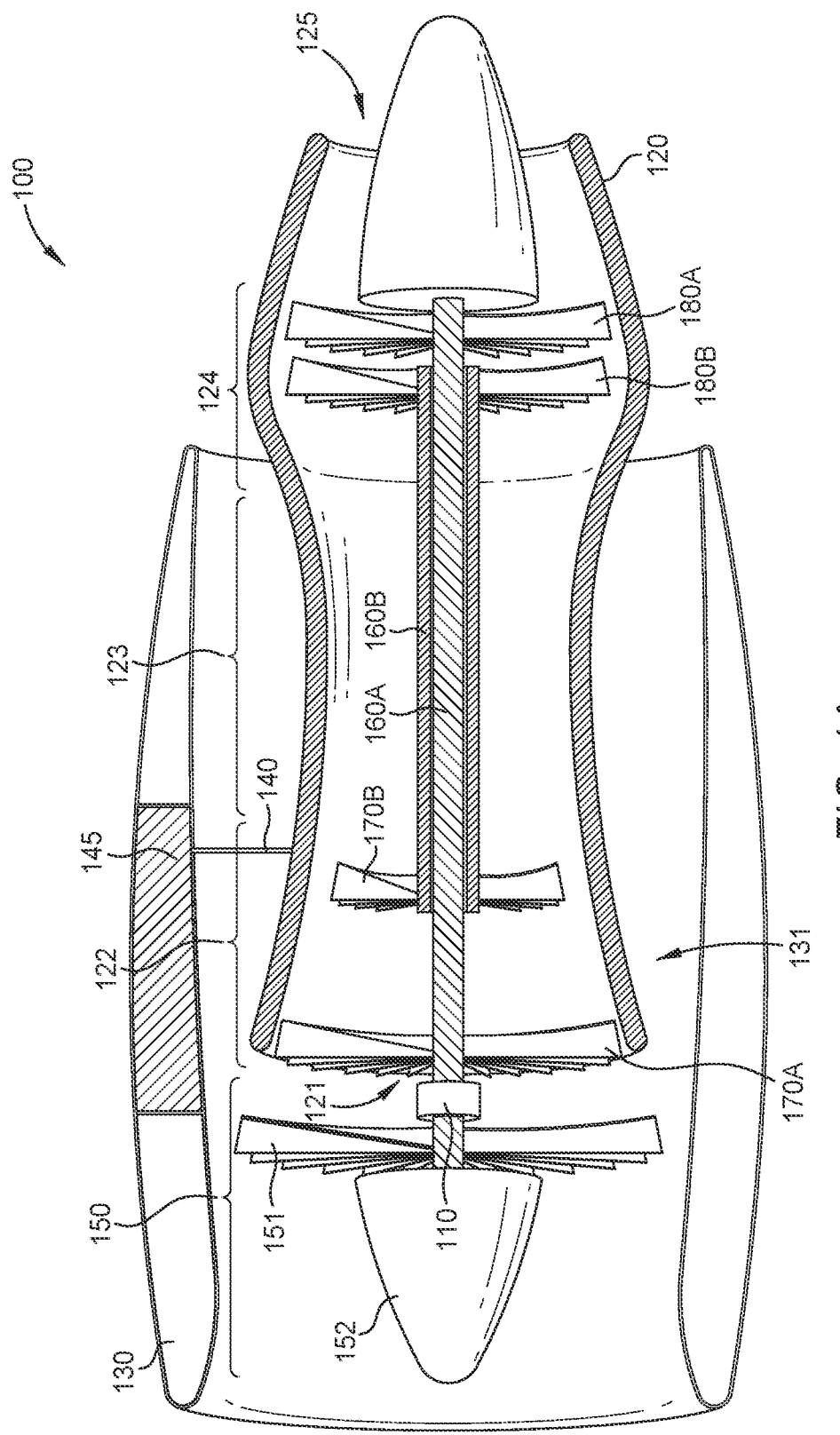
FIGS. 1A-1C illustrate cross-sectional views of turbofan engines that include an electrical gearbox, according to aspects of the present disclosure.
Figure 1B:
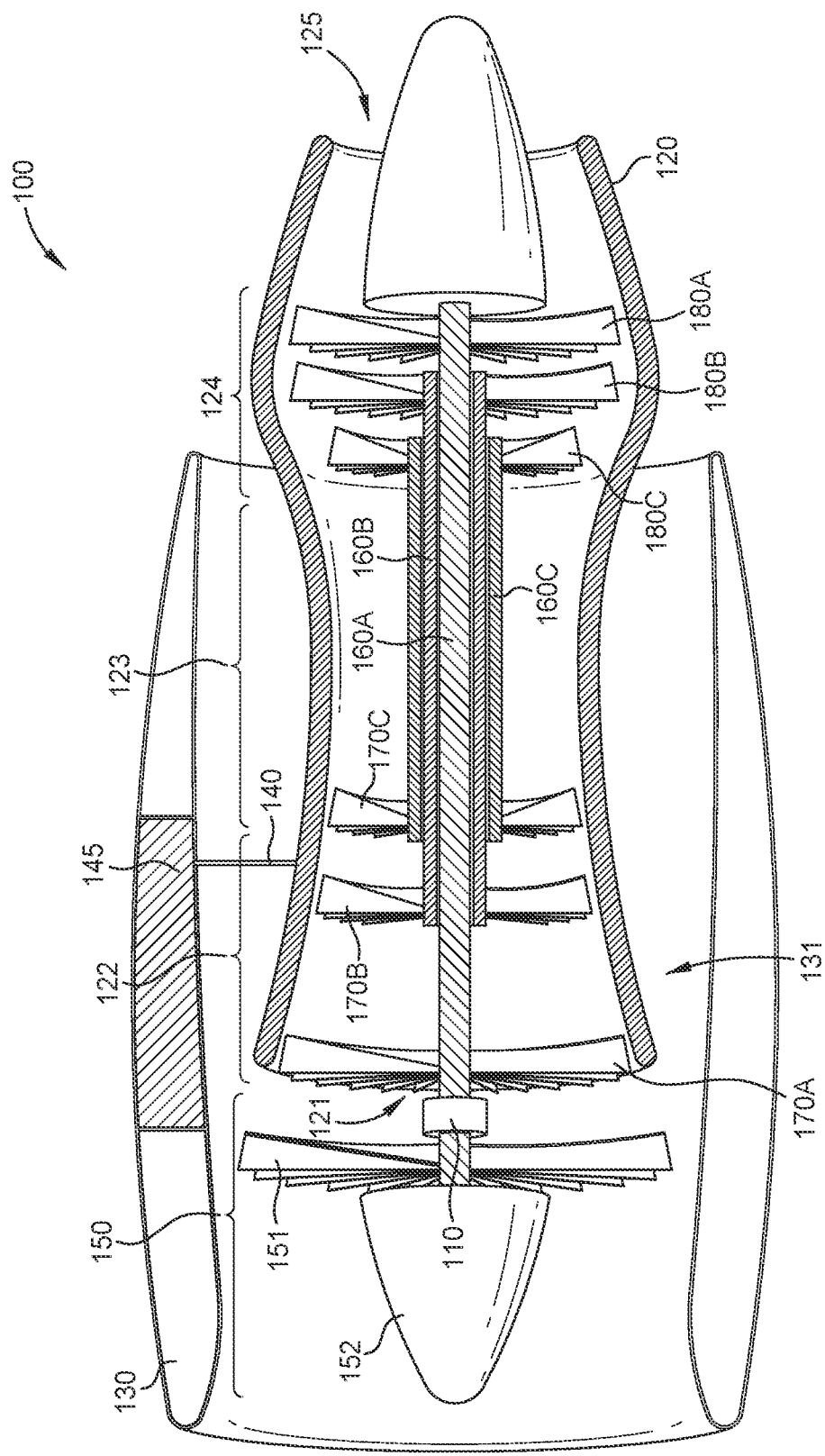
Figure 1C:
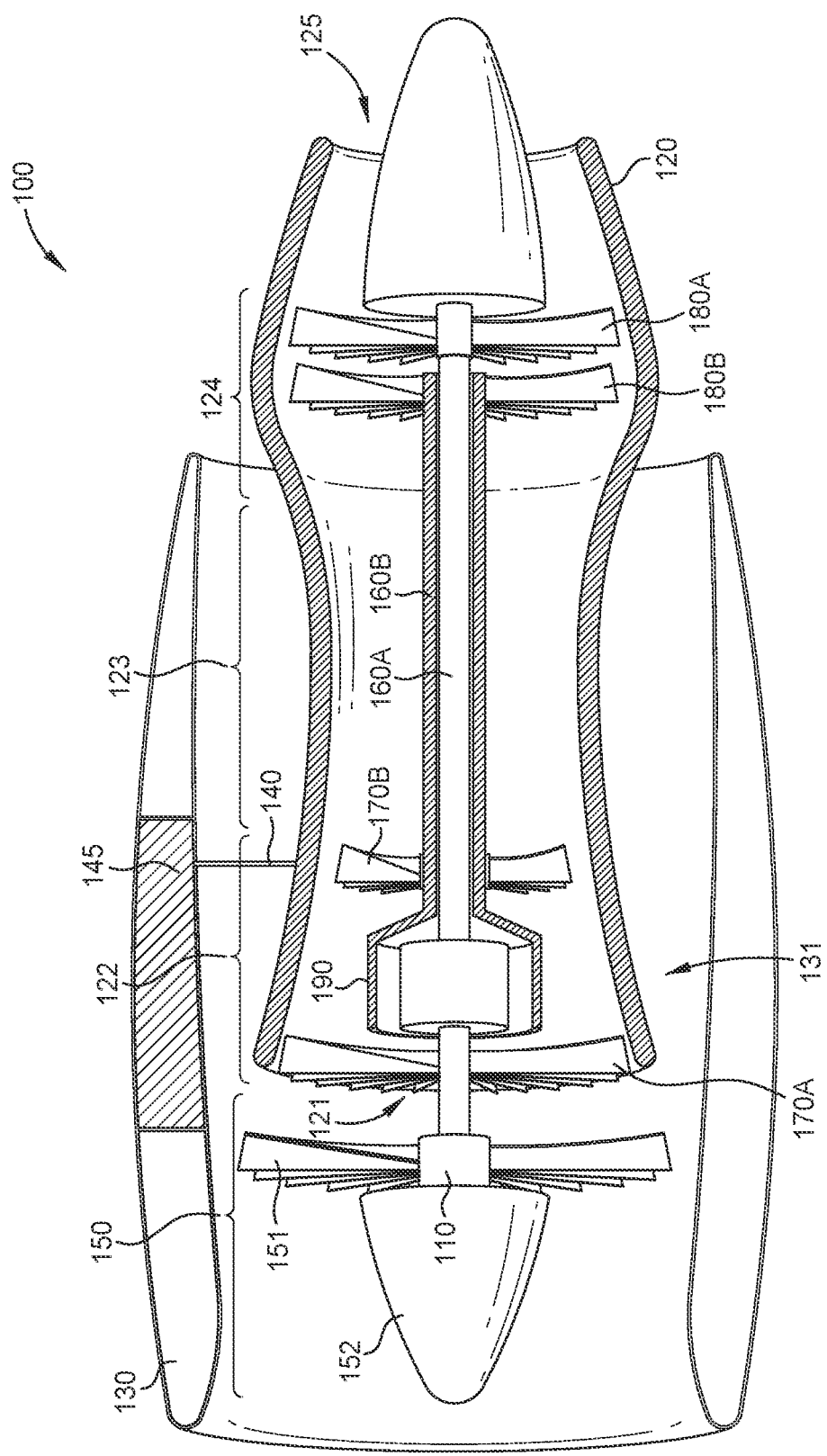

FIGS. 1A-1C illustrate cross-sectional views of turbofan engines 100, (individually, turbofan engine 100A and turbofan engine 100B), which include an electrical gearbox 110, according to aspects of the present disclosure. The turbofan engines 100 include a turbine enclosure 120 defining an air intake 121 at an upstream end, a compression section 122 downstream of the air intake 121, a combustion section 123 downstream of the compression section 122, a turbine section 124 downstream of the combustion section 123, and an exhaust 125 at a downstream end. In various aspects, the turbine enclosure 120 is included inside of a nacelle 130 (also referred to as a housing), and a bypass flow chamber 131 is defined between an outer surface of the turbine enclosure 120 and an inner surface of the nacelle 130. A fan 150 is positioned in the nacelle 130 upstream of the air intake 121 of the turbine enclosure 120, and during operation rotates to propel air inward to the air intake 121 of turbine enclosure 120 as well as through the bypass flow chamber 131, thus providing intake charge and thrust.

FIG. 1A illustrates a turbofan engine 100 that includes a first spool shaft 160A (generally, spool shaft or shaft 160 or collectively, shaft assembly) and a second spool shaft 160B. FIG. 1B illustrates a turbofan engine that includes a first spool shaft 160A, a second spool shaft 160B, and a third spool shaft 160C, although in various aspects a turbofan engine 100 can include one, two, three, or more spool shafts 160.

In the depicted embodiments, each shaft 160 extends coaxially with the other shafts 160, and rotates during operation at different rates relative to one another due to the ejection of high pressure exhaust rotating the turbines 180A-B (generally, turbine 180) per FIG. 1A or turbines 180A-C per FIG. 1B, which in turn drive the associated compressors 170A-B (generally, compressor 170) per FIG. 1A or compressors 170A-C per FIG. 1B at different rates via the connected spool shafts 160. For example, a first spool shaft 160A rotates (due to forces imparted by the first turbine 180A) to drive the rotation of a first compressor 170A at a first rotational speed, while a second spool shaft 160B rotates (due to forces imparted by the second turbine 180B) to drive the rotation of a second compressor 170B at a second rotational speed. Although not illustrated, various bearings or low friction surfaces may be located between the shafts 160 to improve rotational characteristics of the shafts 160 (e.g., to reduce friction).

The compressors 170 are disposed in the compression section 122 of the turbine enclosure 120, and may each include several fan blades arranged in one or more rows. The turbines 180 are disposed in the turbine section 124 of the turbine enclosure 120, and may each include several turbine blades arranged in one or more rows.

As illustrated, the first spool shaft 160A is a low-pressure shaft relative to the high-pressure shaft of the second spool shaft 160B. Accordingly, the first compressor 170A is located upstream of the second compressor 170B, and rotates at a lower rotational speed than the second compressor 170B during operation of the turbofan engine 100. Additionally, the first turbine 180A is located downstream of the second turbine 180B, and rotates at a lower rotational speed than the second turbine 180B during operation of the turbofan engine 100. Similarly, with reference to FIG. 1B, the second compressor 170B is located upstream of the third compressor 170C, and rotates at a lower rotational speed than the third compressor 170C during operation of the turbofan engine 100. Additionally, the second turbine 180B is located downstream of the third turbine 180C, and rotates at a lower rotational speed than the third turbine 180C during operation of the turbofan engine 100.

The rotation of the low-pressure first spool shaft 160A is transferred to a fan 150 via the electrical gearbox 110. The fan 150, when rotated, forces air through the bypass flow chamber 131 of the turbofan engine 100 to provide motive force (e.g., thrust) to a vehicle using the turbofan engine 100. The fan 150 includes a plurality of fan blades 151 extending from a central hub 152, and is generally larger in radius than the corresponding blades of the compressors 170 (and turbines 180) in the turbofan engine 100. As such, if rotated at the same angular velocity or rotational speed (e.g., in revolutions per minute) as the compressors 170, the fan 150 would be subject to higher velocities (and mechanical stresses) at the distal ends of the fan blades 151 than the blades of the compressors 170 and turbines 180. For example, the tips of the blades of the compressors 170 (and turbines 180) may travel at subsonic speeds, but the tips of the fan 150 rotating with the subsonic compressors 170 (and turbines 180) may travel at supersonic speeds due to the greater radius of the fan 150, which can cause noise and vibration issues (in addition to mechanical stresses) as the tips of the fan blades 151 break the sound barrier.

The electrical gearbox 110, described in greater detail in regard to FIGS. 2A-2C, 3A-3C, and 4A-4C, couples the first spool shaft 160A with the hub 152 of the fan 150, and allows the first spool shaft 160A (and the associated first compressors 170A) to rotate at one rotational speed, and the fan 150 to rotate at an independent rotational speed. The independent rotational speeds can include cases in which the fan 150 rotates faster than, slower than, or the same speed as the first spool shaft 160A. In some aspects, an operator can also cause the speeds of the fan 150 and the first spool shaft 160A to change relative to one another (e.g., speeding up or slowing down the fan 150).

The electrical gearbox 110 electromagnetically couples the first spool shaft 160A with the fan 150, using magnetically coupled components as a gearing system, rather than physically interlocking gears, so that the portions of the electrical gearbox 110 physically connected to the first spool shaft 160A and the fan 150 are not in physical contact with one another. Instead, controllable electromagnetic fields selectively link the first spool shaft 160A and the fan 150 over an air gap. An operator controls whether a winding circuit is open or closed, thus selectively coupling and decoupling the components of the electrical gearbox 110 to set an effective gearing ratio based on a duty cycle of the winding circuit. In various aspects, control signals can be transmitted to the electrical gearbox 110 to thereby alter a duty cycle and the ratio between the fan speed and the shaft speed to control the fan speed.

Accordingly, the electrical gearbox 110 is configured to transfer rotational energy from the spool shafts 160 to the fan 150. In some aspects, the electrical gearbox 110 is configured to maintain a static gearing ratio, or is controlled via the shaft-speed without further control signal inputs. The power to create these electromagnetic fields can be supplied by a power distribution bus 145 or other power transfer mechanism for a vehicle in which the turbofan engine 100 is disposed (e.g., via a transfer cable 140 or wireless resonant power transmitter), such as in FIGS. 1A an 1B, or via an electrical generator 190 connected between two spool shafts 160, such as in FIG. 1C, which is discussed in greater detail in regard to FIGS. 8A-8B. In some aspects using an electrical generator 190, the power distribution bus 145 and/or transfer cable 140 can be omitted.

The electrical gearbox 110 thereby allows the spool shafts 160 to rotate at a constant rate and the fan 150 to rotate at a different rate (either constant or based on a variable fan reference speed) by selectively coupling and decoupling the fan 150 from the first spool shaft 160A.

In some aspects, such as in FIG. 1C, an electrical generator 190 is disposed at the interface between the first spool shaft 160A and the second spool shaft 160B (and/or the interface between the second spool shaft 160B and the third spool shaft 160C) to extract electrical energy based on the different rotational speeds of the spool shafts 160. By attaching components of the electrical generators 190 to two different spool shafts (e.g., 160A and 160B) or to two different compressors (e.g., 170A and 170B) at the respective interfaces therebetween, the electrical generator 190 can, based on the differential rotational speed, convert rotational energy into electrical energy via a series of induced magnetic fields that can then be transferred to various systems within and outside of the turbofan engine 100 without requiring physical contact between the generator components rotating at different rates. The electrical generators 190 capitalize on the different rotational speeds of the compressors 170 attached to different shafts 160 to rotate the components relative to one another using the operational rotation of the components of the turbofan engine 100. The construction of the electrical generator 190 is discussed in greater detail in regard to FIGS. 8A-8B.

Figure 2A:
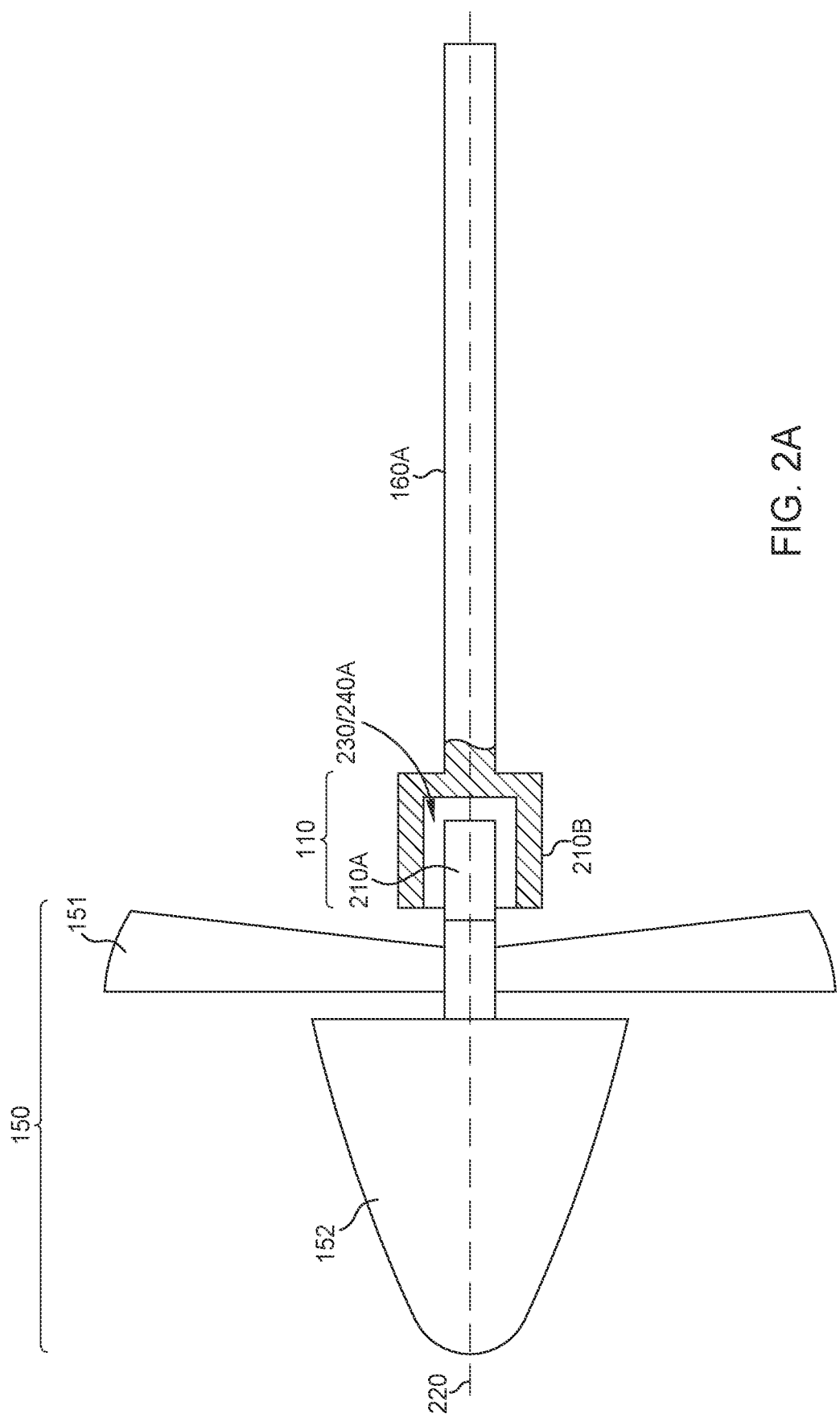
FIGS. 2A-2C illustrate cross-sections for various configurations of the electrical gearbox, according to aspects of the present disclosure.
Figure 2B:
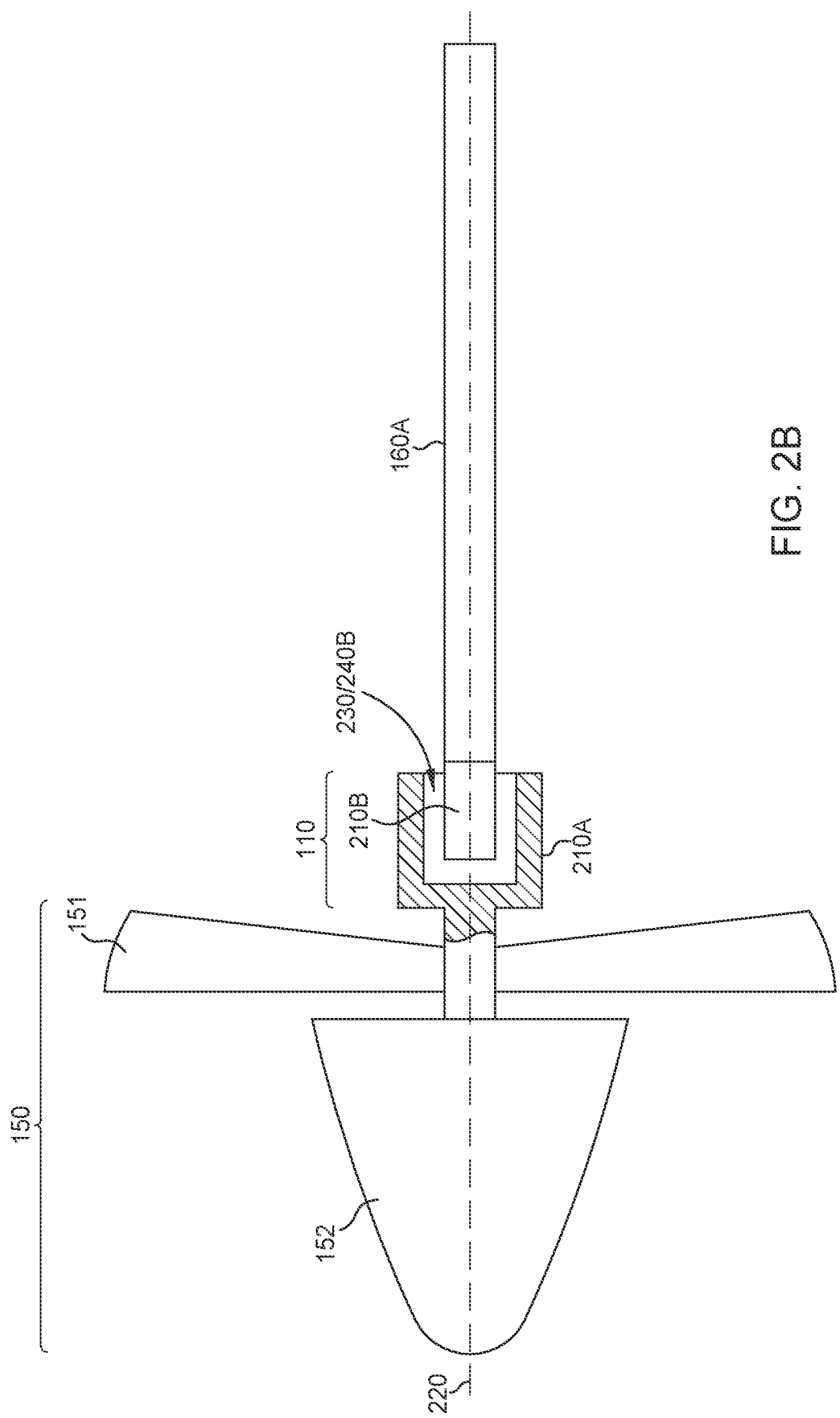
Figure 2C:
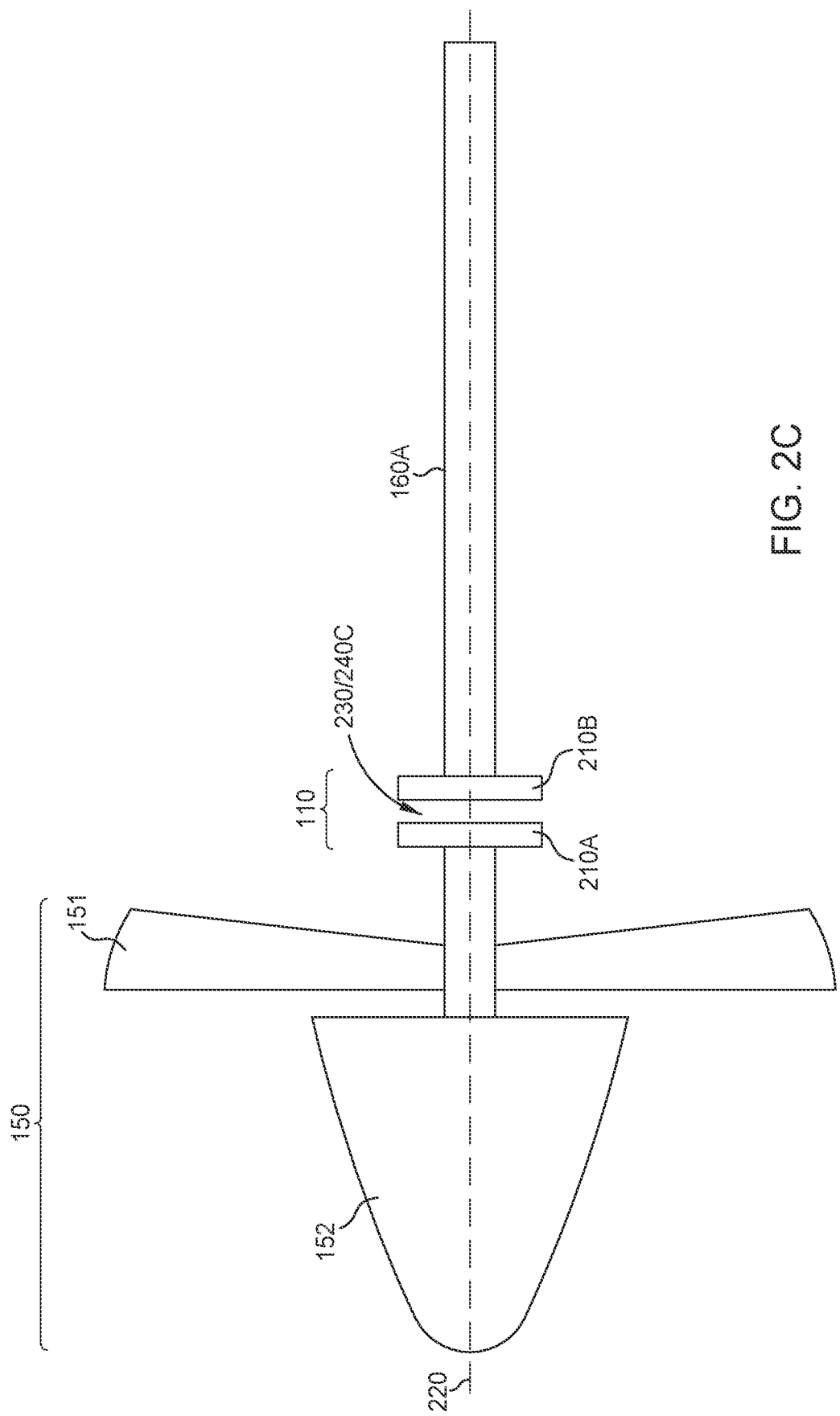

FIGS. 2A-2C illustrate cross-sections for various configurations of the electrical gearbox 110, according to aspects of the present disclosure. As will be appreciated, the electrical gearbox 110 can include a housing or other cover that protects internal components from debris, reduces air resistance, etc., mounting hardware to secure the electrical gearbox 110 to the fan 150 and/or spool shaft 160, etc. Such mechanical features have been omitted from the Figures for clarity in discussing the electromagnetic components and the operation thereof.

In each of the configurations illustrated in FIGS. 2A-2C, a first magnetic gearbox assembly 210A (generally, magnetic gearbox assembly 210) is connected to the fan 150 and a second magnetic gearbox assembly 210B is connected to the first spool shaft 160A. As will be described in greater detail in regard to FIGS. 3A-3C and FIGS. 4A-4C, one of the magnetic gearbox assemblies 210 includes a permanent magnet array, and the other magnetic gearbox assembly 210 includes a winding circuit with a rotor winding (shown in greater detail in FIGS. 3A-3C or FIGS. 4A-4C). The magnetic gearbox assemblies 210 are part of the electrical gearbox 110, and are separated from one another by an air gap 230 that is selectively bridged by electromagnetic fields between the magnetic gearbox assemblies 210.

In FIG. 2A, the second magnetic gearbox assembly 210B defines a first cavity 240A (generally, cavity 240) in which the first magnetic gearbox assembly 210A is positioned. The first cavity 240A is coaxial to the spool shafts 160 so that the first magnetic gearbox assembly 210A and the second magnetic gearbox assembly 210B so that the magnetic gearbox assemblies 210 rotate about a shared axis of rotation 220 at different points along the length of the axis of rotation 220 so as to be clear of the orbit (i.e., not physically contacting) of the other magnetic gearbox assembly 210.

In FIG. 2B, the first magnetic gearbox assembly 210A defines a second cavity 240B in which the second magnetic gearbox assembly 210B is positioned. The second cavity 240B is coaxial to the spool shafts 160 so that the first magnetic gearbox assembly 210A and the second magnetic gearbox assembly 210B so that the magnetic gearbox assemblies 210 rotate about a shared axis of rotation 220 at different points along the length of the axis of rotation 220 so as to be clear of the orbit (i.e., not physically contacting) of the other magnetic gearbox assembly 210.

In FIG. 2C, the first magnetic gearbox assembly 210A and the second magnetic gearbox assembly 210B are positioned in a facing relationship to one another with an air gap 230 between the physical components thereof. The first magnetic gearbox assembly 210A and the second magnetic gearbox assembly 210B are coaxially aligned with one another, the hub 152, and the first spool shaft 160A, and are arranged facially to one another so that the magnetic fields between the magnetic gearbox assemblies 210 are projected coaxially to link the magnetic gearbox assemblies 210. The first magnetic gearbox assembly 210A is arranged in parallel to the second magnetic gearbox assembly 210B so that the air gap 230 is perpendicular to an axis of rotation 220 for the spool shafts 160 to define a planar air gap 240C (rather than a cavity in which one magnetic gearbox assembly 210 envelopes the other), over which the magnetic gearbox assemblies 210 are selectively linked via coaxial magnetic fields.

The relative sizes and positions of the electromagnetically coupled components in FIGS. 2A-2C have been illustrated for easy identification and differentiation. However, in various aspects, the relative sizes, shapes, and orientations of these components may be altered based on the physical properties of the turbofan engine 100 in which the components are installed (e.g., length, thickness, circumference, gap distance, rotational torque, speed, operating temperature, etc.), the desired power transfer characteristics for the extracted rotational energy (e.g., gearing ratios, field strengths, relative speeds), and the like. The lengths of the components along the axis of the shafts 160 determined based on the torque and/or power rating requirements of the vehicle from the turbofan engine 100, and the relative sizes and distances of individual components are sized to optimize torque production and speed from the turbofan engine 100 and power transfer efficiency in the electrical gearbox 110 within the physical confines of the turbofan engine 100. Thus, FIGS. 2A-2C are intended to demonstrate the concepts of operation, and not necessarily a specific implementation, which may be modified based on the power requirements, thrust requirements, turbofan engine 100 specific fuel consumption, and material properties of various components, to name a few considerations.

Figure 3B:
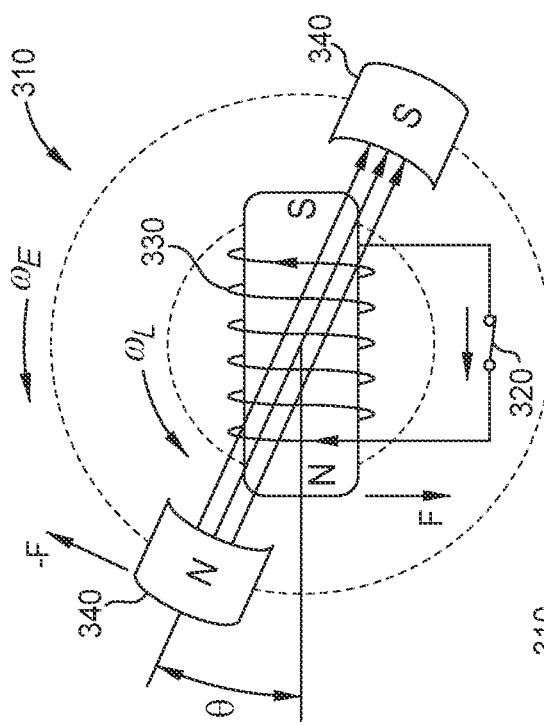
FIGS. 3A-3C illustrate a winding circuit internal to a permanent magnet array for use in an electrical gearbox, according to aspects of the present disclosure.
Figure 3C:
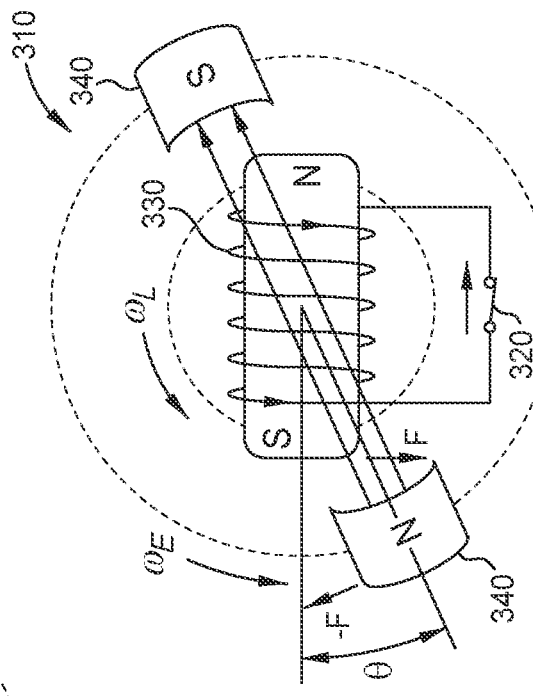
Figure 3A:
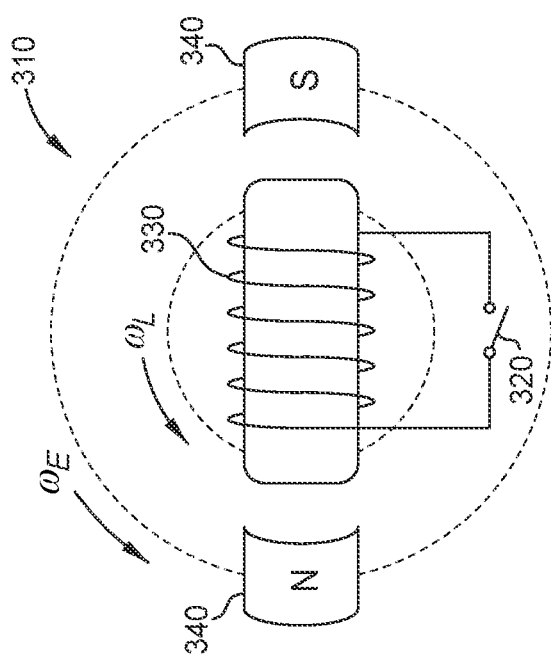
Figure 4B:
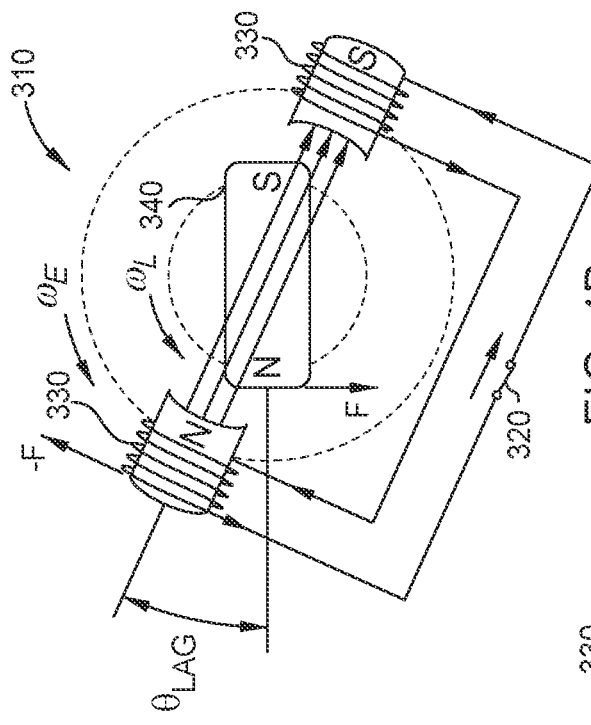
FIGS. 4A-4C illustrate a winding circuit external to a permanent magnet array for use in an electrical gearbox, according to aspects of the present disclosure.
Figure 4C:
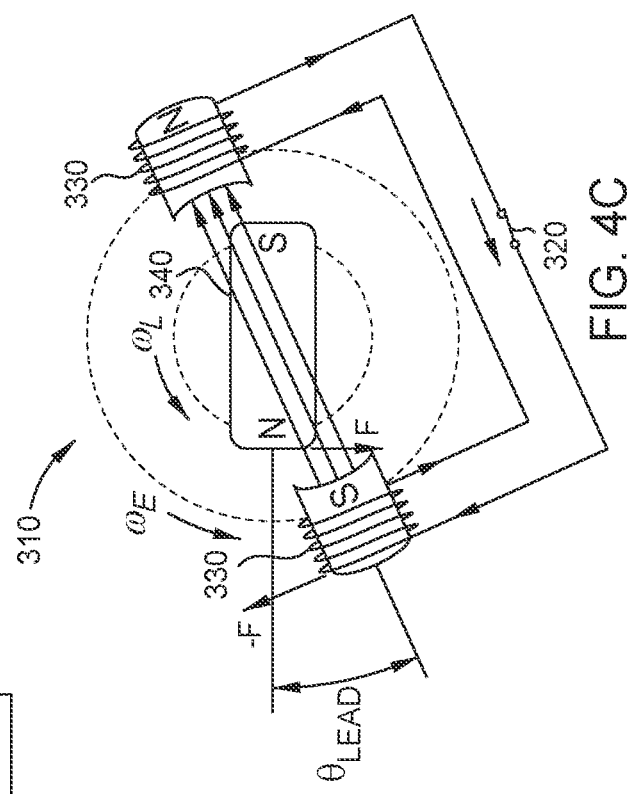
Figure 4A:
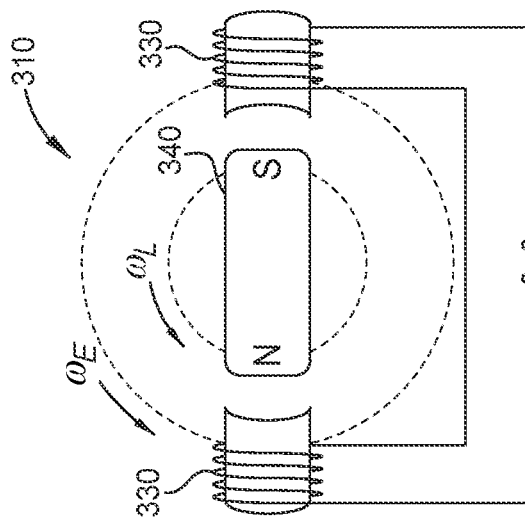

FIGS. 3A-3C and 4A-4C illustrate various arrangements of the first magnetic gearbox assembly 210A relative to the second magnetic gearbox assembly 210B, according to aspects of the present disclosure. FIGS. 3A-3C illustrate a winding circuit 310, including a rotor winding 330 and a switch 320, internal to a permanent magnet array 340, while FIGS. 4A-4C illustrate the winding circuit 310 external to the permanent magnet array 340. Although illustrated with arrays having one pair of magnetic poles (i.e., one North (N) and one South (S) pole), rotor windings 330 and permanent magnet arrays 340 may include additional pairs of magnetic poles in other aspects.

Depending on the configuration of the first magnetic gearbox assembly 210A relative to the second magnetic gearbox assembly 210B (per FIGS. 2A-2C), a first one of the winding circuit 310 and the permanent magnet array 340 are included in the first magnetic gearbox assembly 210A and the second one of the winding circuit 310 and the permanent magnet array 340 are included in the second magnetic gearbox assembly 210B. For example, when the second magnetic gearbox assembly 210B encompasses the first magnetic gearbox assembly 210A (as in FIG. 2A), the second magnetic gearbox assembly 210B may include the winding circuit 310 (as in FIGS. 4A-4C) or the permanent magnet array 340 (as in FIGS. 3A-3C).

FIGS. 3A-3C and 4A-4C are illustrated in a plane perpendicular to the axis of rotation 220 for the spool shafts, and the rotation speed of the internal element (i.e., the winding circuit 310 in FIGS. 3A-3C or the permanent magnet array 340 in FIGS. 4A-4C) is illustrated as $\omega_i$, while the rotation speed of the external element (i.e., the winding circuit 310 in FIGS. 4A-4C or the permanent magnet array 340 in FIGS. 3A-3C) is illustrated as $\omega_e$. When the switch 320 is closed, completing the circuit including the rotor winding 330, rotation of the permanent magnet array 340 relative to the rotor winding 330 induces a current in the winding circuit 310, which generates a magnetic field in the rotor winding 330. The magnetic fields of the permanent magnet array 340 and the winding circuit 310 interact, resulting in the transfer of rotational forces (e.g., torque) from the spool shaft 160 to the fan 150.

FIGS. 3A and 4A illustrate the respective winding circuits 310 and permanent magnet arrays 340 in a neutral position, where the respective winding circuits 310 and permanent magnet arrays 340 are not offset from one another. However, as the components rotate due to forces transferred from the rotation of the spool shafts 160, the external component may lag or lead the external component by an angle θ. FIGS. 3B and 4B illustrate the respective winding circuits 310 and permanent magnet arrays 340 with the external element lagging the internal element by an angle of $\theta_{lag}$ (e.g., 0 radians<$\theta_{lag}$<π/2 radians) in the direction of rotation. FIGS. 3C and 4C illustrate the respective winding circuits 310 and permanent magnet arrays 340 with the external element leading the internal element by an angle of $\theta_{lead}$ (e.g., -π/2 radians<$\theta_{lead}$<0 radians).

In one example, the first magnetic gearbox assembly 210A connected to the first spool shaft 160A includes the permanent magnet array 340 and is external to the second magnetic gearbox assembly 210B that includes the winding circuit 310 (e.g., per FIG. 2A and FIGS. 3A-3C). In the present example, when the permanent magnetic array 340 lags the rotor winding 330, as in FIG. 3B, a current is generated in the rotor winding 330, which in turn generates a rotor magnetic field that is pushed by the permanent magnetic field generated by the permanent magnet array 340. Similarly, when the permanent magnetic array 340 leads the rotor winding 330, as in FIG. 3C, a current is generated in the rotor winding 330, which in turn generates a rotor magnetic field that is pulled by the permanent magnetic field inherent to the permanent magnet array 340. Accordingly, rotational energy is transferred from the first spool shaft 160A to the fan 150 without requiring an external power source to energize the rotor winding 330.

In another example, the first magnetic gearbox assembly 210A connected to the first spool shaft 160A includes the winding circuit 310 and is external to the second magnetic gearbox assembly 210B that includes the permanent magnet array 340 (e.g., per FIG. 2A and FIGS. 4A-4C). In the present example, when the rotor winding 330 lags the permanent magnetic array 340, as in FIG. 4B, a current is generated in the rotor winding 330, which in turn generates a rotor magnetic field that is pushed by the permanent magnetic field generated by the permanent magnet array 340. Similarly, when the rotor winding 330 leads the permanent magnetic array 340, as in FIG. 4C, a current is generated in the rotor winding 330, which in turn generates a rotor magnetic field that is pulled by the permanent magnetic field inherent to the permanent magnet array 340. Accordingly, rotational energy is transferred from the first spool shaft 160A to the fan 150 without requiring an external power source to energize the rotor winding 330.

The switch 320 included in the winding circuit 310 selectively interconnects one end of the rotor winding 330 with the other end to open or close the winding circuit 310. When closed, the switch 320 allows for the current to flow through the rotor winding 330 to generate the rotor magnetic field, thus allowing the permanent magnetic field to push or pull the rotor magnetic field. When open, the switch 320 interrupts the flow of current through the rotor winding 330 and thereby disrupts generation of the rotor magnetic field, thus decoupling the magnetic gearbox assemblies 210. Depending on the duty cycle for how often (and for how long) the switch 320 is open or closed, the rotor winding 330 can alternate between lagging or leading the permanent magnet array 340. Regardless of whether the rotor winding 330 is lagging or leading the permanent magnet array 340, the forces are transferred to rotate the fan 150 in the same direction as the first spool shaft 160A.

The rotational force that is applied as a torque from the first spool shaft 160A to the fan 150 that is proportional to the induced current in the rotor winding 330. By controlling the duty cycle of the switch 320, the average value for the induced current over time can be matched to a desired torque. For a given moment of inertia of a rotor R, the dynamic equation governing the speed thereof is given according to Formula 1, where J is the moment of inertia of the rotor, T is the torque produced by the interaction of the magnetic fields, and b is the friction coefficient.

$$J\frac{d\omega_R}{dt} = T - b\omega_R \quad (1)$$

Assuming a constant friction coefficient b with a rotor under a steady state (i.e., not accelerating), Formula 2 provides a simplified version of Formula 1.

$$T = b_{\theta_R} \quad (2)$$

Accordingly, the rotational speed of the fan 150 is proportional to the averaged value of the induced current in the rotor winding 330 over time.

Figure 5A:
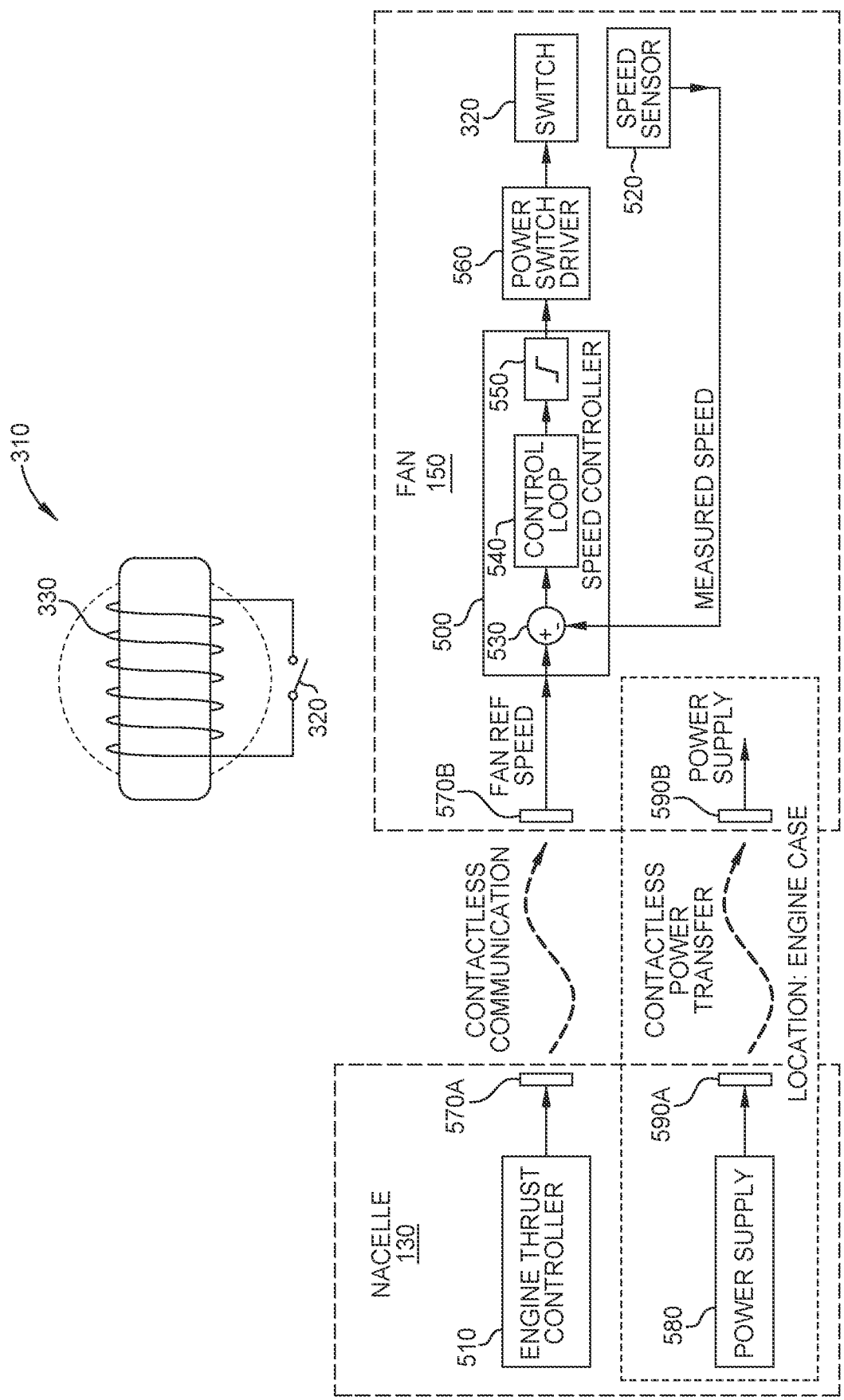
FIGS. 5A-5C illustrate a speed controller for an electrical gearbox, according to aspects of the present disclosure.
Figure 5B:
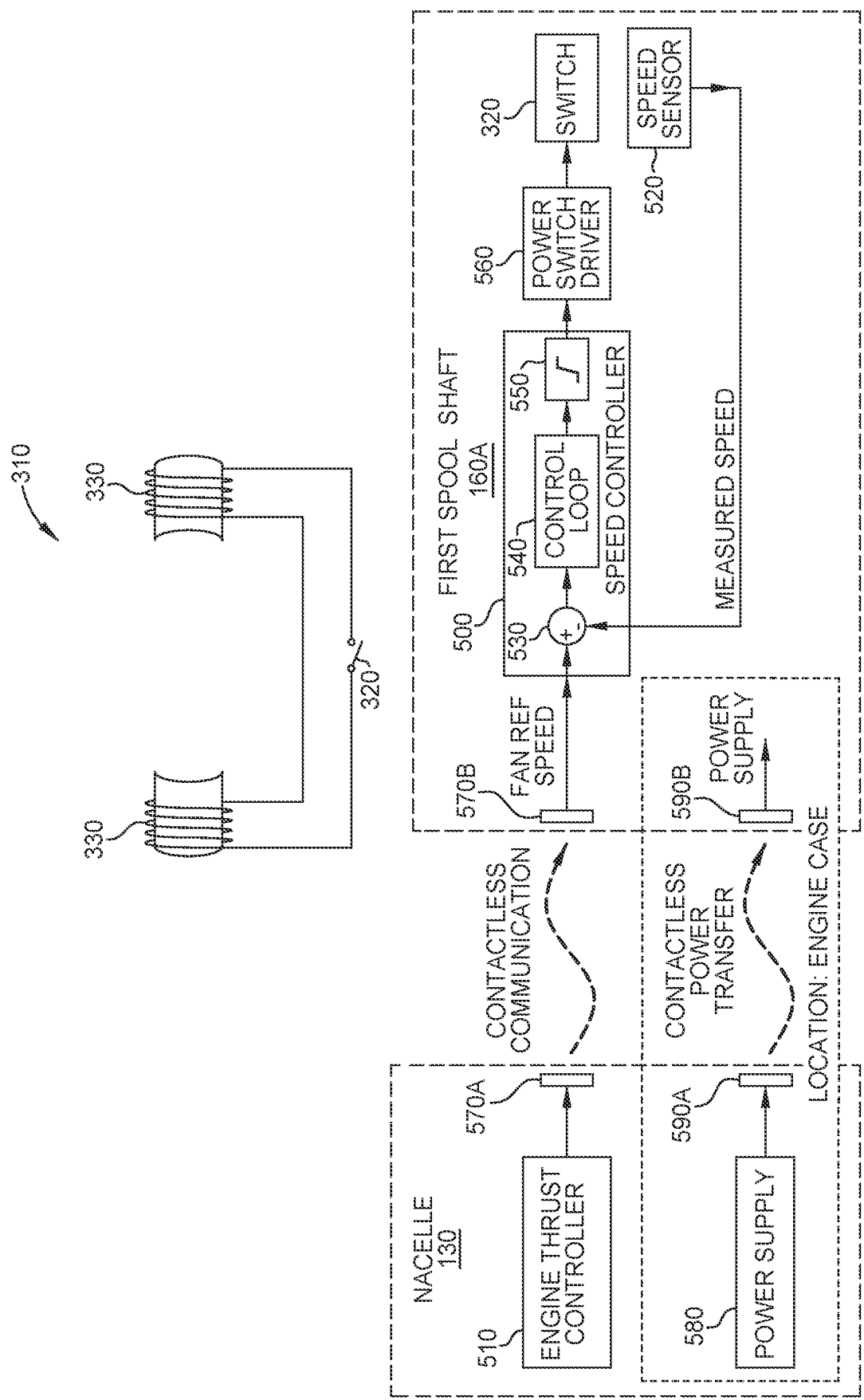
Figure 5C:
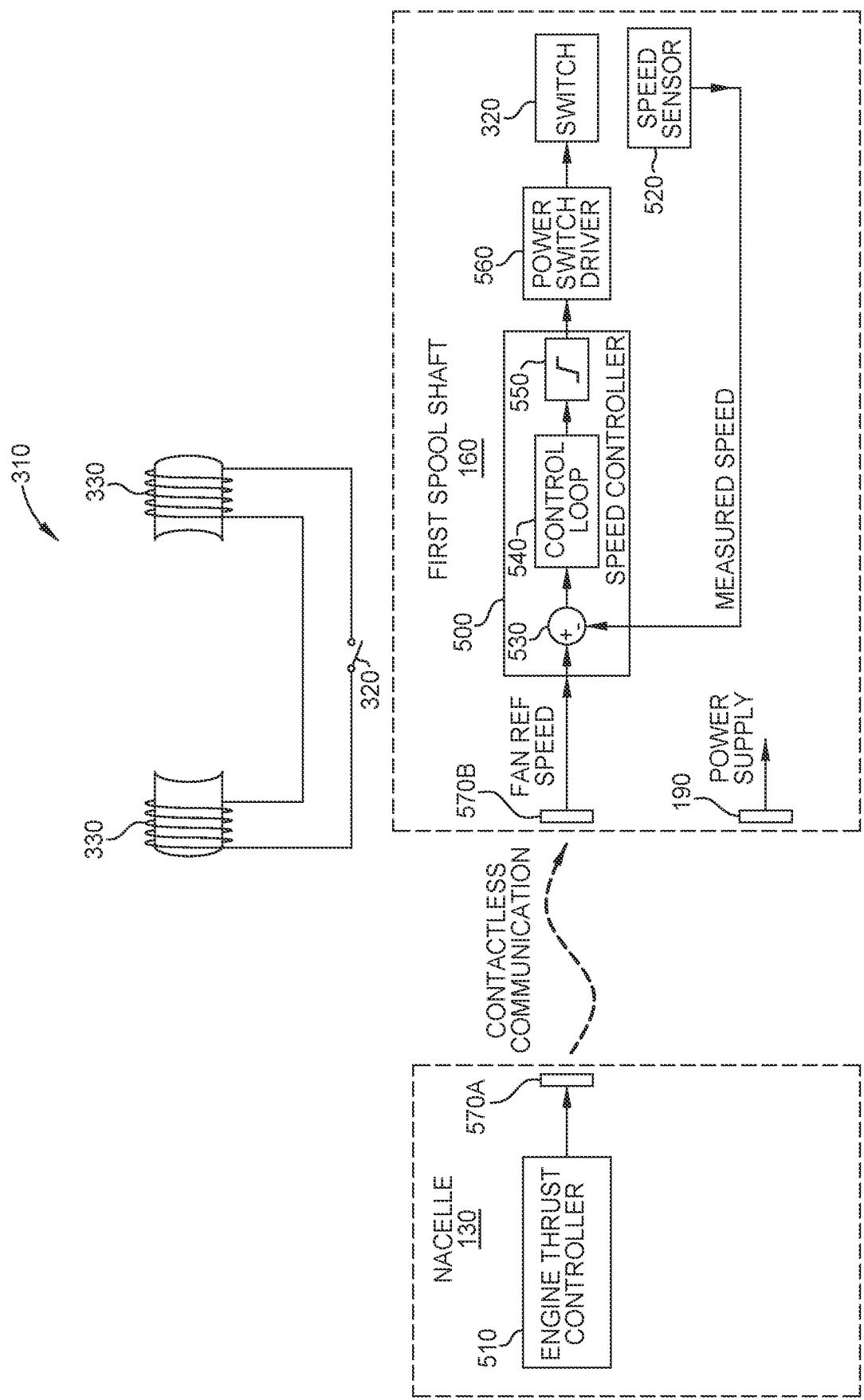

FIGS. 5A-5C illustrate a speed controller 500 for an electrical gearbox 110, according to aspects of the present disclosure. The speed controller 500 sets the duty cycle for the switch 320 to control the induced current in the rotor winding 330, and thereby the speed of the fan 150. The speed controller 500 is co-located with the winding circuit 310 to control the switch 320 included therein. FIG. 5A illustrates an aspect where the speed controller 500 is located on the fan 150 (i.e., when the first magnetic gearbox assembly 210A includes the winding circuit 310) and receives power from an external power supply 580. FIG. 5B illustrates an aspect where the speed controller 500 is located on the first spool shaft 160A (i.e., when the second magnetic gearbox assembly 210B includes the winding circuit 310) and receives power from an external power supply 580. FIG. 5C an aspect where the speed controller 500 is located on the first spool shaft 160A (i.e., when the second magnetic gearbox assembly 210B includes the winding circuit 310) and receives power from a power supply 580 located on the spool shafts 160, in contrast to the aspects discussed in relation to FIGS. 5A and 5B where the power is received from a power supply 580 that transmits power through the engine case and intervening space to the fan 150.

The speed controller 500 receives a reference (or target) speed for the fan 150 from an engine thrust controller 510 and a measured speed for the fan 150 from a speed sensor 520. In various aspects, the engine thrust controller 510 is disposed in the nacelle 130 or the body of the vehicle controlling the turbofan engine 100, and determines the reference speed for the fan 150 based on the operating conditions of the turbofan engine 100 (e.g., altitude, temperature, number of engines employed by the vehicle, etc.) and a desired speed or thrust profile for the vehicle. In some aspects, the engine thrust controller 510 transmits the reference speed to the speed controller 500 via contactless communications (e.g., light or radio waves). Thus, aspects may include a contactless transmitter 570A paired with a contactless receiver 570B used by the speed controller 500 to receive the reference speed.

The speed sensor 520 measures a rotation speed of the fan 150, and may include several different types of sensors deployed at various positions in the turbofan engine 100. In one example, the speed sensor 520 includes a Hall-effect sensor that measures a magnitude of a magnetic field (e.g., produced by a permanent magnet connected to the fan 150) to track the rotation speed of the fan 150 based a frequency of periodic changes in the magnitude of that magnetic field. In another example, the speed sensor 520 includes an inductive sensor, which measures variations in magnetic flux in a generated or induced magnetic field due to changes in proximity to elements of the fan 150 (e.g., as the fan blades 151 are angled) or the magnetic elements included in the first magnetic gearbox assembly 210A. In a further example, the speed sensor 520 includes an opto-isolator sensor that includes a light transmitter and a light receiver to measure how frequently the transmitter and receiver are aligned with one another (e.g., based on a transmitted light beam between transmitters/receivers located separately on the fan 150 and spool shaft 160) or based on reflected signal (e.g., off of a reflective surface of the fan 150 to a reflective pair of transmitters/receivers located on the spool shaft 160) determine the speed of the fan 150.

A comparator 530 compares the reference speed against the measured speed, and provides the difference to a control loop 540, such as a Proportional Integral Derivative (PID) controller, which uses the difference as feedback for how to adjust the duty cycle of the switch 320. For example, when the difference indicates that the measured speed is less than the reference speed, the control loop 540 indicates that the duty cycle should be increased so that the switch 320 stays closed for longer, closed more often, or combinations thereof compared to a current duty cycle. In another example, when the difference indicates that the measured speed is greater than the reference speed, the control loop 540 indicates that the duty cycle should be decreased so that the switch 320 stays open for longer, open more often, or combinations thereof compared to a current duty cycle. Accordingly, the switch 320 is controlled to selectively decouple or selectively couple the magnetic gearbox assemblies 210 of the electrical gearbox 110 in response to the duty cycle indicated by the control loop 540.

In various aspects, the output from the control loop 540 is passed through an integrator 550 to remove spikes in the output, maintain the output within a specified range, and prevent oscillating changes (e.g., alternating small increases and decreases in duty cycle below a threshold adjustment size or within a specified window of time) to reduce jerk or strain on the fan 150 via rapid or frequent changes in the duty cycle.

A power switch driver 560 receives the output from the speed controller 500 to implement the duty cycle for the switch 320. In various aspects, the power switch driver 560 is powered via a current generated in the winding circuit 310 or another inductive loop to open and close the switch 320 according to the selected duty cycle. In various aspects, the power switch driver 560 supplies the power to open a normally-closed switch that closes when the power is no longer supplied, supplies the power to close a normally open-switch that opens when the power is no longer supplied, or supplies the power to change the state of a switch that remains in a current state (i.e., open or closed) when the power is no longer supplied.

In FIGS. 5A and 5B, the power provided to the electrical components of the speed controller 500 and power switch driver 560 is received from a power supply 580 external to the spool shafts 160 and electrical gearbox 110, which may be mounted to the turbine enclosure 120 or nacelle 130 in some aspects. When mounted externally from the electrical gearbox 110, the power is transferred wirelessly over an air gap from a power transmitter 590A that is located with the power supply 580 to a power receiver 590B that is located on the spool shafts 160, the fan, or the electrical gearbox 110. In various aspects, the power transmitter 590A and power receiver 590B can include various near-field coupled devices (e.g., inductive or capacitive coupled devices) or far-field coupled devices (e.g., microwave and laser power beaming devices) according to the distances between the power transmitter 590A and power receiver 590B and intervening objects (including additional power transmitters/receivers for forwarding power between different locations).

In FIG. 5C, the power provided to the electrical components of the speed controller 500 and power switch driver 560 is received from a power supply 580 co-located with the spool shafts 160 or electrical gearbox 110. In various aspects, the power supply 580 of FIG. 5C can be a battery or other power storage and release device, such as a super capacitor. In some aspects, the power supply 580 of FIG. 5C receives input power from a generator 190 connected at an interface between the first spool shaft 160A and the second spool shaft 160B, as is described in greater detail in regard to FIG. 1C.

Figure 6:
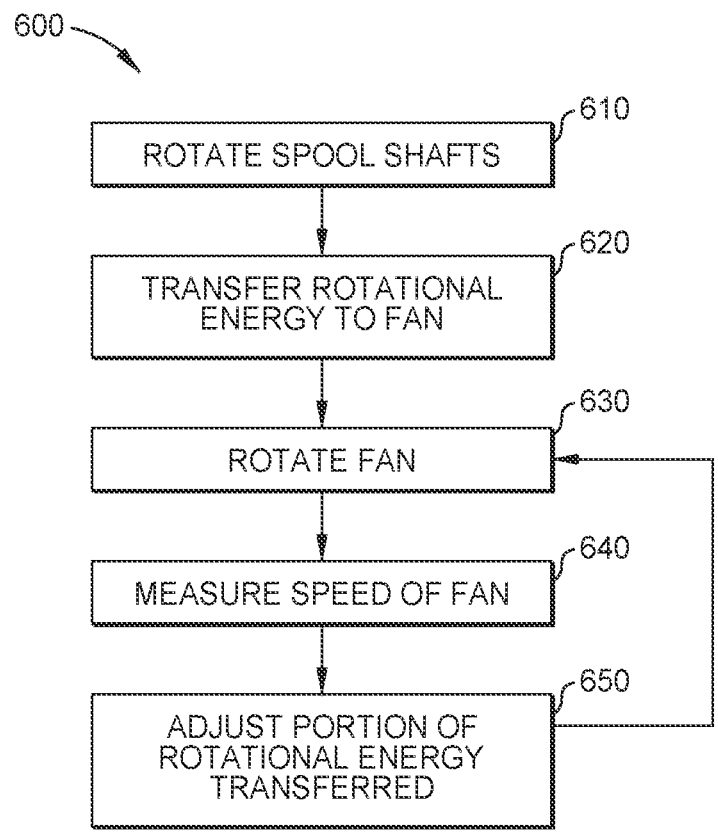
FIG. 6 is a flowchart of a method for controlling a turbofan engine having an electrical gearbox, according to aspects of the present disclosure.

FIG. 6 is a flowchart of a method 600 for controlling a turbofan engine 100 having an electrical gearbox 110, according to aspects of the present disclosure.

Method 600 begins at block 610, where the spool shafts 160 of the turbofan engine 100 rotates. In a turbofan engine 100, an operator may cause spool shafts 160 to rotate by engaging the turbofan engine 100 to produce thrust for a vehicle; inducing rotational energy upon spool shafts 160 by the combustion of fuel in a combustion chamber and expelling the exhaust through a turbine section 124, thus causing the turbines 180 to rotate the corresponding spool shafts 160. Depending on the number of spool shafts 160 in the turbofan engine 100, the thrust requirements of the vehicle using the turbofan engine 100, the altitude of the vehicle using the turbofan engine 100, etc., the spool shafts 160 may rotate at various different speeds.

At block 620, the electrical gearbox 110 transfers rotational energy from the first spool shaft 160A of the turbofan engine 100 to the fan 150. A first magnetic gearbox assembly 210A of the electrical gearbox 110 is connected to the first spool shaft 160A, and includes one of a winding circuit 310 or a permanent magnet array 340. A second magnetic gearbox assembly 210B of the electrical gearbox 110 is connected to the fan 150, and includes a different one of the winding circuit 310 or the permanent magnet array 340 from what is included in the first magnetic gearbox assembly 210A. The magnetic gearbox assemblies 210 are separated from one another via an air gap 230, but are (selectively) electromagnetically coupled over the air gap 230 via a rotor magnetic field selectively generated by a rotor winding 330 and a permanent magnetic field generated by a permanent magnet array 340.

By rotating the first spool shaft 160A (and the connected first magnetic gearbox assembly 210A) at a first rotational speed, a current is induced in a rotor winding 330 of the winding circuit 310 when a switch 320 therein is closed. When the current is induced in the rotor winding 330, the rotor winding 330 generates a rotor magnetic field that is pushed or pulled in the direction of rotation of the first spool shaft 160A by the permanent magnetic field associated with the permanent magnet array 340. Accordingly, the rotational energy of the first spool shaft 160A is transferred from via the first magnetic gearbox assembly 210A to the second magnetic gearbox assembly 210B, which is connected to the fan 150, thus causing the fan 150 to rotate with the first spool shaft 160A.

At block 630, the fan 150 rotates at a second rotational speed based on the first rotational speed of the first spool shaft 160A and the duty cycle for the switch 320 selected by the speed controller 500.

At block 640, the speed controller 500 measures the second rotational speed of the fan 150. In various aspects, a speed sensor 520 (such as a Hall-effect sensor, an inductive sensor, an opto-isolator sensor, or the like) measures the speed of the fan 150, and the speed controller 500 compares the measured speed against a reference (or target) speed at which the fan 150 has been set to rotate at. The speed controller 500 determines whether to adjust the duty cycle of the switch 320 (and thereby the speed of the fan 150) based on whether a difference between the reference speed for the fan 150 and the measured speed for the fan 150 falls outside of a threshold range (e.g., $\Delta(\omega_{reference}, \omega_{measured}) \pm x$ % of $\omega_{reference}$).

At block 650, the speed controller 500 adjusts a portion of the rotational energy transferred to the fan 150 based on a duty cycle of the switch 320 in the winding circuit 310 of the electrical gearbox 110. By increasing a relative amount of time that the switch 320 is closed, the speed controller 500 increases the portion of the rotational energy transferred from the spool shafts 160 to the fan 150, thus increasing the speed of the fan 150. Similarly, by decreasing the relative amount of time that the switch 320 is open, the speed controller 500 decreases the portion of the rotational energy transferred from the spool shafts 160 to the fan 150, thus decreasing the speed of the fan 150. When the reference speed is greater than the measured speed and outside of the threshold, method 600 returns to block 630 with an increased duty cycle for the switch 320 to thereby increase the speed of the fan 150. When the reference speed is less than the measured speed and outside of the threshold, method 600 returns to block 630, with a decreased the duty cycle for the switch 320 to thereby decrease the speed of the fan 150. Method 600 may thus continue so as to control the speed of the fan 150 with respect to updated reference speeds, changes in environmental conditions, changes in rotational speeds of the spool shafts 160, and combinations thereof.

Figure 7:
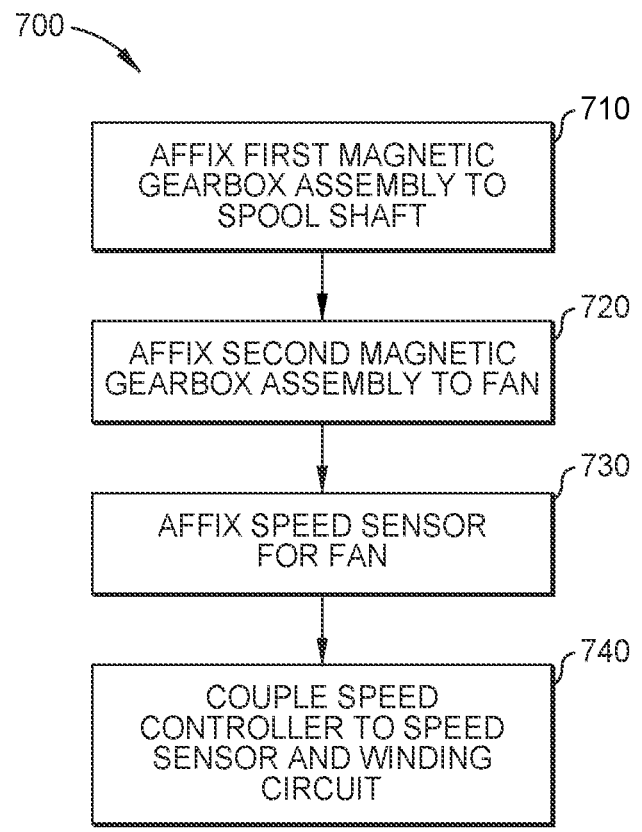
FIG. 7 is a flowchart of a method for fabricating a turbofan engine with an electrical gearbox, according to aspects of the present disclosure.

FIG. 7 is a flowchart of a method 700 for fabricating a turbofan engine 100 with an electrical gearbox 110, according to aspects of the present disclosure.

At block 710, a fabricator affixes a first magnetic gearbox assembly 210A to a first spool shaft 160A of a turbofan engine 100.

At block 720, the fabricator affixes a second magnetic gearbox assembly 210B to the fan 150 of the turbofan engine 100.

The first magnetic gearbox assembly 210A includes a first one of a winding circuit 310 and a permanent magnet array 340, while the second magnetic gearbox assembly 210B includes the second one of the winding circuit 310 and the permanent magnet array 340, different from the first one included in the first magnetic gearbox assembly 210A. The first magnetic gearbox assembly 210A and the second magnetic gearbox assembly 210B define an air gap 230 between one another, such that the first magnetic gearbox assembly 210A and the second magnetic gearbox assembly 210B are not in physical contact with one another. Rather, the first magnetic gearbox assembly 210A and the second magnetic gearbox assembly 210B are configured to be selectively in magnetic contact with one another. In various aspects, the first magnetic gearbox assembly 210A is disposed in a first cavity 240A defined by the second magnetic gearbox assembly 210B (as per FIG. 2A), the second magnetic gearbox assembly 210B is disposed in a second cavity 240B defined by the first magnetic gearbox assembly 210A, or the magnetic gearbox assemblies 210 are disposed parallel to one another to define an air gap 230 that is perpendicular to the axis of rotation 220 for the spool shafts 160 (as per FIG. 2C).

At block 730, the fabricator affixes a speed sensor 520 in the turbofan engine 100 for the fan 150, to monitor a rotational speed of the fan 150. The speed sensor 520 can include various types of speed sensing or measuring devices including, but not limited to: Hall-effect sensors, inductive sensors, and opto-isolator sensors. In various aspects, the speed sensor may include components affixed to one or more of the fan 150, the first spool shaft 160A, the turbine enclosure 120, the nacelle 130, or other components of the turbofan engine 100.

At block 740, the fabricator couples the speed controller 500 to the speed sensor 520 and to the winding circuit 310. The speed controller 500 is configured to adjust a duty cycle of a switch 320 included in the winding circuit 310 based on a difference between the rotational speed of the fan 150 as measured by the speed sensor 520 and a desired speed for the fan 150, as indicated by an engine thrust controller 510 in contactless communication with the speed controller 500. The speed controller 500 is located on the fan 150 when the first magnetic gearbox assembly 210A includes the winding circuit 310, or is located on the first spool shaft 160A when the second magnetic gearbox assembly 210B includes the winding circuit 310.

Figure 8A:
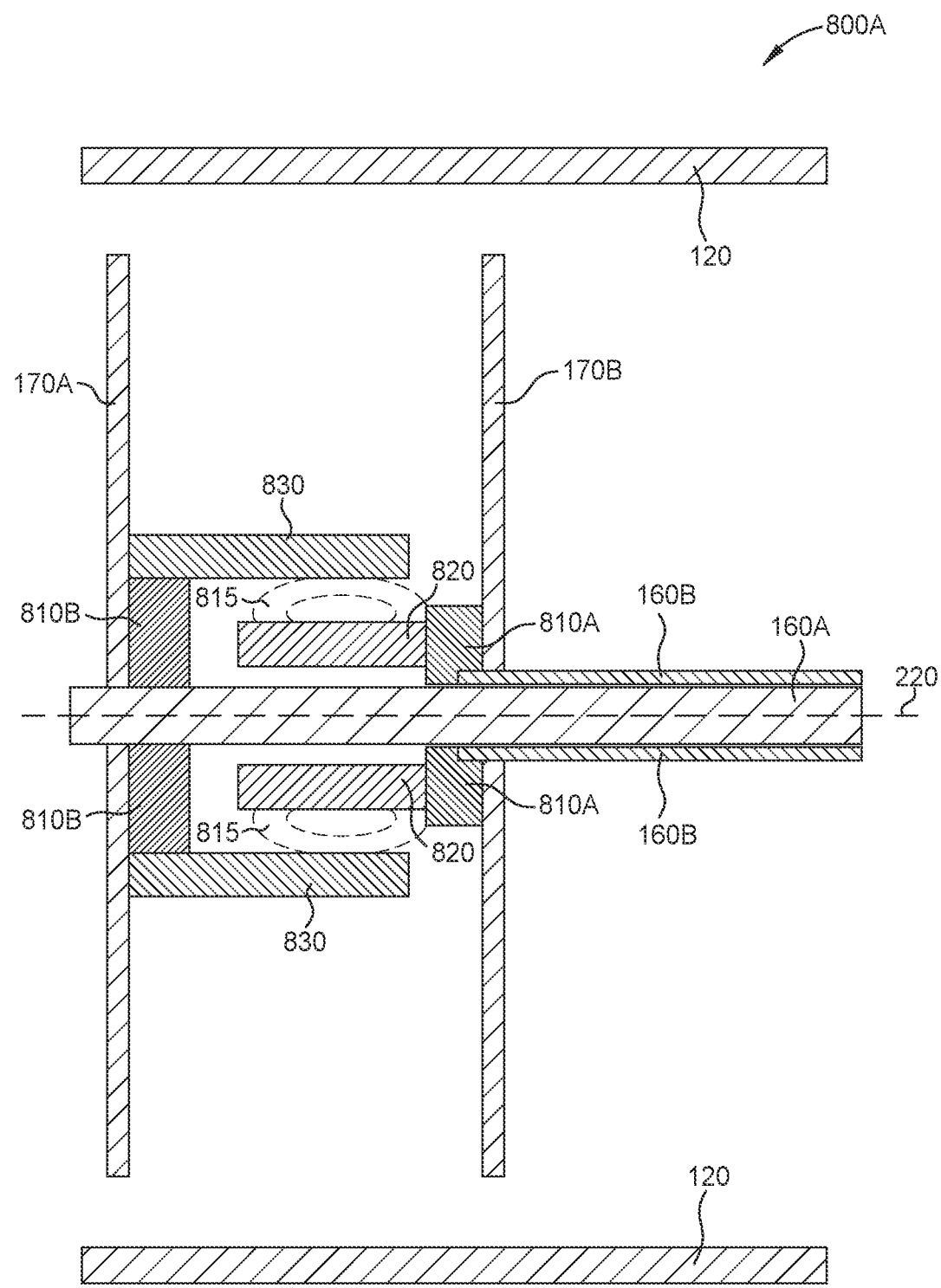
FIGS. 8A-8B illustrates a component arrangements for an electrical generator, according to aspects of the present disclosure.

FIG. 8A illustrates a first component arrangement 800A for an electrical generator 190, according to aspects of the present disclosure. A first rotor assembly 810A is connected to a second (higher-pressure) compressor 170B and a second rotor assembly 810B is connected to a first (lower-pressure) compressor 170A at an interface between the two compressors 170A-B. In various aspects, the rotor assemblies 810A-B are connected to one or more blades of the associated compressor 170, to a ring/connection point of the blades to an associated spool shaft 160, or to the associated spool shaft 160. The rotor assemblies 810A-B position various electromagnetic components of the electrical generator 190 at known distances and orientations relative to one another, the shafts 160, and the compressors 170.

In FIG. 8A, the first rotor assembly 810A includes a permanent magnet 820, which produces a generator magnetic field 815. The permanent magnet 820 emits the generator magnetic field 815 radially through an air gap defined coaxially to the shafts 160 to magnetically link the permanent magnet 820 with a generator armature winding 830 included in the second rotor assembly 810B. In various aspects, the permanent magnet 820 may include a plurality of magnets arranged circumferentially around the shaft 160 to emit a plurality of generator magnetic fields 815.

The second rotor assembly 810B includes the generator armature winding 830 arranged concentrically and radially, but not in physical contact with, the permanent magnet 820 or the shafts 160, and positions the generator armature winding 830 within a predefined field strength of the generator magnetic field 815. Accordingly, the generator magnetic field 815 radially links the permanent magnet 820 and the generator armature winding 830.

Figure 8B:
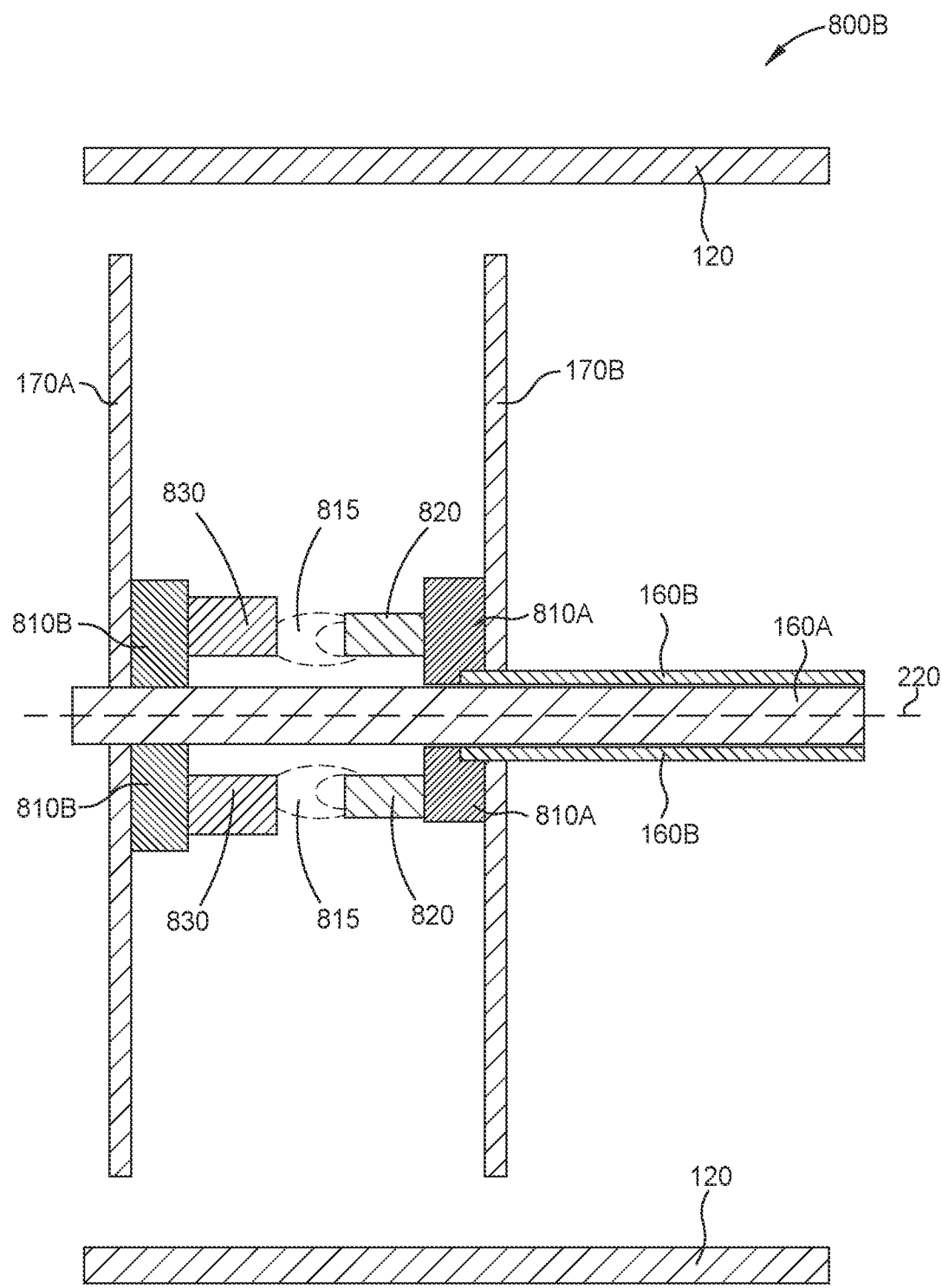

FIG. 8B illustrates a second component arrangement 800B for an electrical generator 190, according to aspects of the present disclosure. A first rotor assembly 810A is connected to a higher-pressure second compressor 170B and a second rotor assembly 810B is connected to a lower-pressure first compressor 170A at an interface between the two compressors 170. In various aspects, the rotor assemblies 810A-B are connected to one or more blades of the associated compressor 170, to a ring/connection point of the blades to an associated spool shaft 160, or to the associated spool shaft 160. The rotor assemblies 810A-B position various electromagnetic components of the electrical generator 190 at known distances and orientations relative to one another, the shafts 160, and the compressors 170.

In FIG. 8B, the first rotor assembly 810A includes a permanent magnet 820, which produces a generator magnetic field 815. The permanent magnet 820 emits the generator magnetic field 815 through an air gap defined in a plane intersecting the axis of rotation for the shafts 160 to magnetically link the permanent magnet 820 with a generator armature winding 830 included in the second rotor assembly 810B. Although illustrated as defining an air gap in a plane orthogonal to the axis of rotation (e.g., for a coaxial magnetic linkage between the permanent magnet 820 and the generator armature winding 830), in other aspects, the air gap may be defined at other angles relative to the shafts 160. In various aspects, the permanent magnet 820 may include a plurality of magnets arranged radially around the shaft 160 to emit a plurality of generator magnetic fields 815.

The second rotor assembly 810B includes the generator armature winding 830 arranged radially around, but not in physical contact with, the shafts 160 and arranged planetary to the permanent magnet 820. The relative positions and lengths of the rotor assemblies 810A-B position the generator armature winding 830 within a predefined field strength of the generator magnetic field 815. Accordingly, the generator magnetic field 815 axially links the permanent magnet 820 and the generator armature winding 830.

During operation of the turbofan engine 100 in which the components are disposed, the rotational forces imparted by turbines 180 cause the compressors 170 and attached EM components to rotate relative to one another and the stationary turbine enclosure 120. Due to the differential in the rotational speeds of the higher-pressure compressor 170B and the lower-pressure compressor 170A, the generator magnetic field 815 rotates relative to the generator armature winding 830. Accordingly, electrical energy is extracted from the rotational forces of the shafts 160 and is transferred to power the speed controller 500 of the electrical gearbox 110, among other components (e.g., as a power supply 580).

The relative sizes and positions of the electromagnetically coupled components in FIGS. 8A and 8B have been illustrated for easy identification and differentiation. However, in various aspects, the relative sizes, shapes, and orientations of these components may be altered based on the physical properties of the turbofan engine 100 in which the components are installed (e.g., length, thickness, circumference, gap distance, rotational torque, and speed, operating temperature), the desired power characteristics for the extracted power (e.g., number of power phases, voltage/current levels), and the like. The lengths of the components along the axis of the shafts 160 are determined by the torque and/or power rating requirements of the vehicle from the turbofan engine 100, and the relative sizes and distances of individual components are sized to optimize torque production and speed from the turbofan engine 100 and power transfer efficiency in the electrical generator 190 within the physical confines of the turbofan engine 100. Thus, FIGS. 8A and 8B are intended to demonstrate the concepts of operation, and not necessarily a specific implementation, which may be modified based on the power requirements, thrust requirements, turbofan engine 100 specific fuel consumption, and material properties of various components. For example, a fabricator can design the permanent magnet 820 and the generator armature winding 830 according to FIG. 8A when radial space along the length of blades of the compressors 170 is more readily available or according to FIG. 8B when axial space between the compressors 170 is more readily available.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A system, comprising:
a first magnetic gearbox assembly connected to a fan of a turbofan engine;
a second magnetic gearbox assembly connected to a spool shaft of the turbofan engine; and
a speed controller configured to adjust a rotational speed of the fan based on a rotational speed of the spool shaft by selectively coupling and decoupling the first magnetic gearbox assembly with the second magnetic gearbox assembly,
wherein the first magnetic gearbox assembly is configured to couple and decouple with the second magnetic gearbox assembly by opening and closing a switch in a winding circuit,
wherein the adjustment of the rotational speed of the fan is based on a difference between a reference speed for the fan and a measured speed of the fan,
wherein the reference speed is based on operating conditions of the fan and thrust profile for the turbofan engine,

19 wherein the measured speed is based on a measured magnitude of a magnetic field, and
wherein the speed controller controls the rotational speed of the fan, based on the difference between the reference speed for the fan and the measured speed of the fan, by increasing or decreasing a duty cycle of the switch, said duty cycle including how often the switch is open or closed.

2. The system of claim 1, wherein:
the first magnetic gearbox assembly includes a permanent magnet array;
the second magnetic gearbox assembly includes a rotor winding separated from the permanent magnet array by an air gap; and
the speed controller is configured to selectively couple and decouple the first magnetic gearbox assembly with the second magnetic gearbox assembly via opening and closing the switch in the winding circuit with the rotor winding.

3. The system of claim 1, wherein:
the second magnetic gearbox assembly includes a permanent magnet array;
the first magnetic gearbox assembly includes a rotor winding separated from the permanent magnet array by an air gap; and
the speed controller is configured to selectively couple and decouple the first magnetic gearbox assembly with the second magnetic gearbox assembly via opening and closing the switch in the winding circuit with the rotor winding.

4. The system of claim 1, wherein the first magnetic gearbox assembly is positioned coaxially within a cavity defined by the second magnetic gearbox assembly.

5. The system of claim 1, wherein the second magnetic gearbox assembly is positioned coaxially within a cavity defined by the first magnetic gearbox assembly.

6. The system of claim 1, wherein the first magnetic gearbox assembly and the second magnetic gearbox assembly are electromagnetically linked via a coaxial magnetic field.

7. The system of claim 1, wherein the speed controller is configured to decouple the first magnetic gearbox assembly from the second magnetic gearbox assembly by at least opening the switch via a switch driver powered by a current generated by the first magnetic gearbox assembly rotating relative to the second magnetic gearbox assembly.

8. The system of claim 1, wherein the speed controller further comprises a speed sensor, the speed sensor including at least one of:
a Hall-effect sensor;
an inductive sensor; or
an opto-isolator sensor.

9. The system of claim 1, further comprising: an engine thrust controller configured to transmit the reference speed to the speed controller via contactless communication.

10. A turbofan engine, comprising:
a fan;
a turbine enclosure, comprising:
an air intake at an upstream end;
a compression section downstream of the air intake;
a combustion section downstream of the compression section;
a turbine section downstream of the combustion section; and
an exhaust at a downstream end;

20 a first spool shaft coupled with a first compressor of the compression section and with a first turbine of the turbine section;
an electrical gearbox located upstream of the turbine enclosure, the electrical gearbox including a first magnetic gearbox assembly connected to the fan and a second magnetic gearbox assembly connected to the first spool shaft, wherein the electrical gearbox is configured to transfer rotational energy over an air gap between the first magnetic gearbox assembly and the second magnetic gearbox assembly to the fan rotating at a first rotational speed from the first spool shaft rotating at a second rotational speed; and
a speed controller coupled to the electrical gearbox and configured to selectively couple and decouple the first magnetic gearbox assembly with the second magnetic gearbox assembly over the air gap to adjust the first rotational speed to a variable fan reference speed while maintaining the second rotational speed at a constant rate,
wherein the first magnetic gearbox assembly is configured to couple and decouple with the second magnetic gearbox assembly by opening and closing a switch in a winding circuit,
wherein the adjustment of the first rotational speed of the fan is based on a difference between the variable fan reference speed for the fan and a measured speed of the fan, wherein the variable fan reference speed is based on operating conditions of the fan and thrust profile for the turbofan engine,
wherein the measured speed is based on a measured magnitude of a magnetic field, and
wherein the speed controller controls the first rotational speed of the fan, based on the difference between the reference speed for the fan and the measured speed of the fan, by increasing or decreasing a duty cycle of the switch, said duty cycle including how often the switch is open or closed.

11. The turbofan engine of claim 10, wherein:
the first magnetic gearbox assembly includes a permanent magnet array and the second magnetic gearbox assembly includes the winding circuit defining a rotor winding; and
the speed controller is configured to reduce the duty cycle of the switch in the winding circuit to reduce the first rotational speed relative to the second rotational speed.

12. The turbofan engine of claim 10, wherein:
the first magnetic gearbox assembly includes the winding circuit defining a rotor winding and the second magnetic gearbox assembly includes a permanent magnet array; and
the speed controller is configured to reduces the duty cycle of the switch in the winding circuit to reduce the first rotational speed relative to the second rotational speed.

13. The turbofan engine of claim 10, wherein the air gap is one of:
coaxial to the first spool shaft defined by disposing the second magnetic gearbox assembly in a first cavity defined by the first magnetic gearbox assembly;
coaxial to the first spool shaft defined by the first magnetic gearbox assembly in a second cavity defined by the second magnetic gearbox assembly; and
perpendicular to an axis of rotation for the first spool shaft defined by disposing the first magnetic gearbox assembly parallel to the second magnetic gearbox assembly.

* * * * *